(12) United States Patent
Bhattacharyya et al.

(10) Patent No.: US 10,862,945 B2
(45) Date of Patent: Dec. 8, 2020

(54) ADAPTIVE RESTFUL REAL-TIME LIVE MEDIA STREAMING

(71) Applicant: Tata Consultancy Services Limited, Mumbai (IN)

(72) Inventors: Abhijan Bhattacharyya, Kolkata (IN); Suvrat Agrawal, Bengaluru (IN); Hemant Kumar Rath, Bhubaneswar (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 205 days.

(21) Appl. No.: 16/108,920

(22) Filed: Aug. 22, 2018

(65) Prior Publication Data

US 2019/0253475 A1      Aug. 15, 2019

(30) Foreign Application Priority Data

Feb. 14, 2018  (IN) .............................. 201821005659

(51) Int. Cl.
*H04L 29/06* (2006.01)
*H04N 19/172* (2014.01)
(Continued)

(52) U.S. Cl.
CPC ........ *H04L 65/608* (2013.01); *H04L 12/1872* (2013.01); *H04L 12/1877* (2013.01);
(Continued)

(58) Field of Classification Search
CPC ............... H04L 65/608; H04L 12/1872; H04L 12/1877; H04L 65/4084; H04L 65/602;
(Continued)

(56) References Cited

U.S. PATENT DOCUMENTS

| 9,253,021 | B2* | 2/2016 | Vasseur ............... H04L 41/0896 |
| 9,749,146 | B2* | 8/2017 | Lee ..................... H04L 12/2809 |
| 2017/0295503 | A1* | 10/2017 | Govindaraju ........... H04W 4/38 |

FOREIGN PATENT DOCUMENTS

| WO | WO-2013/127437 | 9/2013 |
| WO | WO-2016/210109 | 12/2016 |

OTHER PUBLICATIONS

Bhattacharyya, A. et al. (May 2016). "CoAP option for no server-response-draft-tcs-coap-no-response-option-1," *IETF Trust* (18 pages), available at https://tools.ietf.org/pdf/draft-tcs-coap-no-response-option-17.pdf.

(Continued)

*Primary Examiner* — Sm A Rahman
(74) *Attorney, Agent, or Firm* — Finnegan, Henderson, Farabow, Garrett & Dunner LLP

(57) ABSTRACT

Conventional protocols for live media streaming are not lightweight and hence not suitable for constrained video transmitting devices. The protocols are poor in terms of delay performance under lossy conditions and need to maintain a lot of states at the constrained transmitting end leading to load on the memory and draining energy of the devices. The conventionally used protocols do not perform well for intermittent connectivity. Usually the existing streaming solutions act either in completely reliable manner, using reliable transport protocol like TCP, or in completely unreliable manner using best effort unreliable transport protocol like UDP. The present disclosure provides a single streaming solution which can change the protocol semantics and maintains a balance between reliability and delay-performance, thereby optimizing the overall system good-put. The protocol does this intelligently by inferring the criticality of the segment in flight and enable live video streaming for Internet of Things (IoT).

16 Claims, 18 Drawing Sheets

(51) Int. Cl.
    *H04N 19/37*    (2014.01)
    *H04L 12/18*    (2006.01)
    *H04L 29/08*    (2006.01)
(52) U.S. Cl.
    CPC ........ *H04L 65/4084* (2013.01); *H04L 65/602* (2013.01); *H04L 65/80* (2013.01); *H04L 67/327* (2013.01); *H04L 69/163* (2013.01); *H04L 69/165* (2013.01); *H04N 19/172* (2014.11); *H04N 19/37* (2014.11)
(58) Field of Classification Search
    CPC ..... H04L 65/80; H04L 67/327; H04L 69/163; H04L 69/165; H04N 19/172; H04N 19/37
    See application file for complete search history.

(56) References Cited

OTHER PUBLICATIONS

Krawiec, P. et al. (Jun. 2017). "Dynamic adaptive streaming over CoAP," *Multimedia Tools and Applications*, vol. 77, No. 4; pp. 4641-4660.

* cited by examiner

ADAPTIVE RESTFUL REAL-TIME LIVE MEDIA STREAMING

PRIORITY CLAIM

This U.S. patent application claims priority under 35 U.S.C. § 119 to: Indian Patent Application No. 201821005659, filed on 14 Feb. 2018. The entire contents of the aforementioned application are incorporated herein by reference.

TECHNICAL FIELD

The disclosure herein generally relates to media streaming particularly when a client (producer) may be a constrained device, and more particularly relates to systems and methods for adaptive REpresentational State Transfer (RESTful) real-time live media streaming for Internet of Things (IoT).

BACKGROUND

Internet of Things (IoT) has emerged with a concept of billions of constrained sensors exchanging frequent-but-small sensory information amongst themselves. Applications like Augmented Reality (AR), Simultaneous Localization and Mapping (SLAM) for robots using visual information from cameras attached to remote robots (visual SLAM), surveillance using Unmanned Aerial Vehicles (UAV), and the like, coupled with advances in machine intelligence algorithms have created a renewed interest in efficient transmission of media, particularly, live video in real-time over the Internet.

Popularly used protocols for streaming live video from resource constrained remote robotic eye (for instance, a UAV fitted with camera) to a video consumer over the Internet or Local Area Network over a wireless access mechanism like WiFi include Hyper Text Transfer Protocol (HTTP) on Transmission Control Protocol (TCP), Real-time Messaging Protocol (RTMP) on Transmission Control Protocol (TCP) and a combination of Real-Time Session Protocol (RTSP)+Real-Time Protocol (RTP)+Real-Time Control Protocol (RTCP) wherein RTSP maintains a session between end-points and usually runs on TCP but may run on User Datagram Protocol (UDP); RTP carries the actual video data on UDP; and RTCP runs on UDP and carries the control information.

Out of these, HTTP on TCP is the most used in browsers and many applications. Applications like YouTube use RTMP on TCP for live streaming. RTSP+RTP+RTCP is not in use except some dedicated enterprise infrastructures. Considering HTTP on TCP and RTMP on TCP, the transport protocol used is TCP. But TCP is not made for real-time video and suffers in terms of throughput in the presence of loss in the channel or intermittent connection. This happens because TCP primarily ensures reliability of delivery and penalizes delay performance. That is contrary to the goal of achieving quality of service (QoS) for video transmission. Also, the way TCP reacts to loss in the channel, through its congestion control mechanism, actually undermines the available bandwidth and reduces the throughput. But TCP has an advantage that it ensures ordered delivery of packets. So, the application layer does not have to deal with these complexities. RTMP on TCP also has similar problems and advantage.

On the other hand solution using a combination of RTSP, RTP and RTCP is good in terms of delay performance but is complex and needs special media servers. Unlike HTTP on TCP, this solution does not fit in conventional Web architecture which is used to transfer other web traffic as well. Also, reliability is poor. HTTP on TCP uses REpresentational State Transfer (RESTful) architecture which is the conventional architecture for the exchange of Web traffic while RTMP on TCP and RTSP+RTP+RTCP based solution do not. Moreover, none of these protocols are lightweight.

SUMMARY

Embodiments of the present disclosure present technological improvements as solutions to one or more of the above-mentioned technical problems recognized by the inventors in conventional systems.

In an aspect, there is provided a processor implemented method comprising: dividing each frame from an acquired plurality of frames of a streaming media into a plurality of segments having a maximum size limited by a maximum transmission unit (MTU) associated with an underlying network of transmission of the plurality of media frames; analyzing the plurality of segments for characteristics that are critical for rendering the streaming media at a video consumer end and thereby identifying one or more critical segments from the plurality of segments, wherein the characteristics include position, segment length and video format of the streaming media; adapting transmission semantics, in real-time, by utilizing the characteristics of the identified one or more critical segments in flight by inferring to send the one or more critical segments as reliable requests with guaranteed delivery and remaining segments from the plurality of segments as unreliable requests with best-effort delivery; and transmitting the plurality of segments as REpresentational State Transfer (RESTful) requests.

In another aspect, there is provided a system comprising: one or more internal data storage devices operatively coupled to one or more hardware processors for storing instructions configured for execution by the one or more hardware processors, the instructions being comprised in a video producer configured to: divide each frame from an acquired plurality of frames of a streaming media into a plurality of segments having a maximum size limited by a maximum transmission unit (MTU) associated with an underlying network of transmission of the plurality of media frames; analyze the plurality of segments for characteristics that are critical for rendering the streaming media at a video consumer end and thereby identify one or more critical segments from the plurality of segments, wherein the characteristics include position, segment length and video format of the streaming media; adapt transmission semantics, in real-time, utilizing the characteristics of the identified one or more critical segments in flight by inferring to send the one or more critical segments as reliable requests with guaranteed delivery and remaining segments from the plurality of segments as unreliable requests with best-effort delivery; and transmit the plurality of segments as REpresentational State Transfer (RESTful) requests.

In yet another aspect, there is provided a computer program product comprising a non-transitory computer readable medium having a computer readable program embodied therein, wherein the computer readable program, when executed on a computing device, causes the computing device to: divide each frame from an acquired plurality of frames of a streaming media into a plurality of segments having a maximum size limited by a maximum transmission unit (MTU) associated with an underlying network of transmission of the plurality of media frames; analyze the plurality of segments for characteristics that are critical for rendering the streaming media at a video consumer end and thereby identifying one or more critical segments from the plurality of segments, wherein the characteristics include position, segment length and video format of the streaming media; adapt transmission semantics, in real-time, utilizing the characteristics of the identified one or more critical segments in flight by inferring to send the one or more critical segments as reliable requests with guaranteed delivery and remaining segments from the plurality of segments as unreliable requests with best-effort delivery; and transmit the plurality of segments as REpresentational State Transfer (RESTful) requests.

In an embodiment of the present disclosure, the computer readable program further causes the computing device to: parse the RESTful requests and responding only for the one or more critical segments transmitted as reliable requests with guaranteed delivery; compare the timestamp ($T_n$) of the current segment with the time timestamp ($T_0$) of a first segment received; buffer each of the plurality of segments in a circular manner from $buffer_0$ through $buffer_{N-1}$ and around based on the position associated with each of the plurality of segments, wherein the buffer is implemented as a 2-dimensional array of the timestamp and the position and wherein N represents number of buffers configurable based on delay performance of an associated channel of transmission; and play out from an appropriate buffer at a constant rate determined by a frame rate associated with the streaming media.

In an embodiment of the present disclosure, the video producer is further configured to transmit the one or more critical segments by a confirmable (CON) message and the remaining segments from the plurality of segments are transmitted by a non-confirmable (NON) message using Constrained Application Protocol (CoAP).

In an embodiment of the present disclosure, the non-confirmable (NON) message is accompanied by a No-Response option.

In an embodiment of the present disclosure, the video producer is further configured to transmit the plurality of segments as the RESTful request by utilizing CoAP with header options including: Stream_info being a request option and a response option having one or more Least Significant Bits (LSBs) indicating a state of exchange (stream_state) and one or more Most Significant Bits (MSBs) indicating an identifier (stream_id) for the streaming media; Timestamp being a request option relating to the plurality of segments to a corresponding frame in a play sequence of the streaming media; and Position being a request option having one or more MSBs indicating an offset at which a current segment is placed in a frame corresponding to an associated timestamp and one or more LSBs indicating whether the current segment is a last segment of the frame corresponding to the associated timestamp.

In an embodiment of the present disclosure, data type associated with the header options is 1 unsigned byte for the stream_info with 3 LSBs indicating the state of exchange (stream_state) and 5 MSBs indicating the identifier (stream_id); the data type associated with the timestamp is 32 bit unsigned integer; and the data type associated with the position is 16 bit unsigned integer with 15 MSBs indicating the offset and 1 LSB indicating whether the current segment is the last segment of the frame.

In an embodiment of the present disclosure, the video producer is further configured to analyze the plurality of segments for characteristics that are critical for rendering the streaming media by determining the characteristics including position, segment length and video format of the streaming media; comparing the determined position and segment length associated with the determined video format with corresponding characteristics in a pre-defined library of characteristics for various formats; and identifying one or more critical segments based on the comparison.

In an embodiment of the present disclosure, the system described herein above further comprises a video consumer configured to parse the RESTful requests and responding only for the one or more critical segments transmitted by the CON message; compare the timestamp ($T_n$) of the current segment with the time timestamp ($T_0$) of a first segment received; buffer each of the plurality of segments in a circular manner from $buffer_0$ through $buffer_{N-1}$ and around based on the position associated with each of the plurality of segments, wherein the buffer is implemented as a 2-dimensional array of the timestamp and the position and wherein N represents number of buffers configurable based on delay performance of an associated channel of transmission; and play out from an appropriate buffer at a constant rate determined by a frame rate associated with the streaming media.

In an embodiment of the present disclosure, the video producer is further configured to abort transmitting of the remaining segments from the plurality of segments associated with a frame, in the event that transmitting of the one or more critical segments by the CON message is unsuccessful; and transmit the one or more critical segments of a subsequent frame.

In an embodiment of the present disclosure, the video producer is further configured to perform a handshake either before transmitting the plurality of segments as a Representational state transfer (RESTful) request or during an ongoing session based on proposed parameters associated with the streaming media, negotiated parameters thereof and either accepting or rejecting of the proposed parameters or the negotiated parameters resulting in initiating transmitting of the streaming media or aborting the streaming media respectively, prior to transmitting the plurality of segments as a Representational state transfer (RESTful) request.

In an embodiment of the present disclosure, the handshake comprises exchange of at least one of control feedback messages and commands from the video consumer end.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
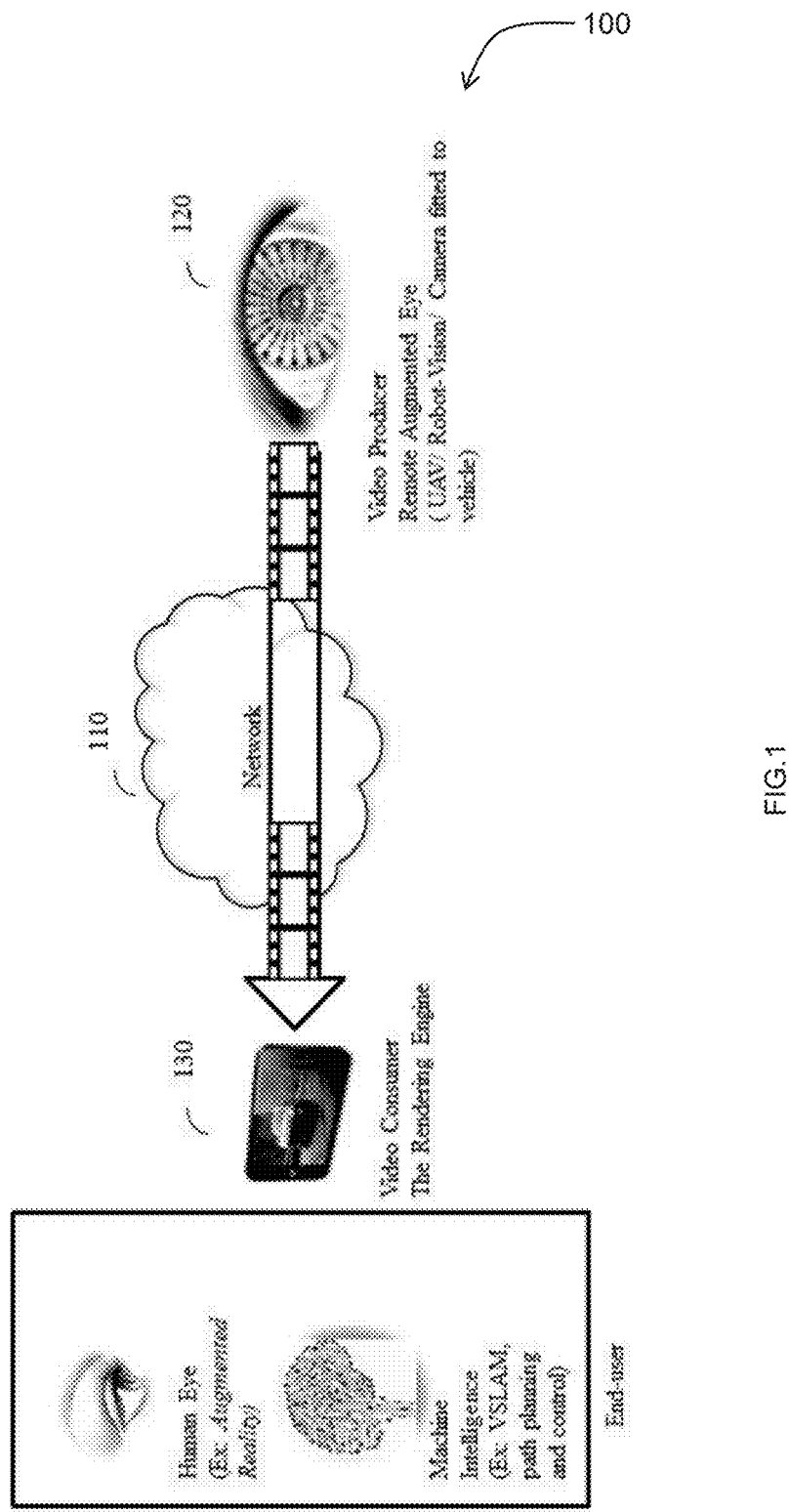
FIG. 1 illustrates an exemplary application scenario for systems and methods of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Video streaming for Internet of Things (IoT) applications has bolstered renewed interest in increasing efficiency in real-time live media streaming under challenging environment. The perception of efficiency in this case encompasses a multitude of factors like Quality of Experience (QoE), reduction in consumption of network resources, reduction in memory and processing overhead, frugality of solution architecture, ease of integration with existing Internet architecture, and the like. Conventional approach for media, particularly, video streaming over Internet Protocol (IP) is to use Transmission Control Protocol (TCP) which prioritizes reliability over delay performance. Thus the real-time performance and goodput suffers under lossy/intermittent network conditions due to TCP overhead leading to frequent video freeze and deviation from strict play-out intervals. TCP based solutions adapt the source bit-rate to maintain the overall QoE. Applications over unreliable User Datagram Protocol (UDP) maintain real-time requirements but suffer severe degradation of QoE under lossy network conditions. Systems and methods of the present disclosure provide a lightweight real-time live streaming protocol particularly for applications involving real-time remote vision. The protocol aims to maintain a balance between reliability and delay performance through an adaptation mechanism of application-layer protocol semantics on the fly by inferring criticality of instantaneous application data segment in flight. An exemplary implementation of the protocol extends an existing standard Constrained Application Protocol (CoAP).

CoAP is an application layer which enables web-service interactions with constrained devices used in IoT. CoAP is the only protocol that supports HTTP like RESTful request/response exchanges on UDP. This way CoAP draws a parallel for the IoT paradigm against the conventional Web. A request can be sent either in reliable or confirmable (CON) message, or in a non-confirmable (NON) message. In case of CON message the delivery of the request is confirmed by an acknowledgement (ACK) message by the server. In case of NON message there is no ACK from the server and hence no retransmission.

The protocol HTTP-on-TCP is characterized by features such as RESTful architecture, standardized request/response APIs, reliable, wide adoption and congestion avoidance while the protocol RTP-on-UDP is characterized by features such as delivery of the payload in a best-effort manner, transfer of the payload is a completely open loop transaction, delay performance is high but there is no reliability. The protocol CoAP is a combination of some desirable features from HTTP-on-TCP and RTP-on-UDP and provides a strong base to build A-REaLiST of the present disclosure in an undisruptive manner.

The design of CoAP has some features which are effectively utilized by the systems and methods of the present disclosure. Firstly, CoAP allows switching between reliable and unreliable mode on top of UDP. Thus application level intelligence can help maintain an optimum balance between reliability and delay-performance which is hither-to-unavailable in the standard streaming solutions. Secondly, CoAP, being the standard RESTful protocol on top of UDP, allows designing the streaming protocol as a combination of stateless transfer of requests. The statelessness helps in quick recovery in an otherwise intermittent/lossy environment. Thirdly, intelligent use of No-Response option along with NON mode can convert typical exchanges into a complete open-loop transaction. Thus, the delay performance and bandwidth efficiency can be extremely improved. Fourthly, the base CoAP specification is inherently designed for resource constrained devices. Hence, designing the streaming protocol of the present disclosure on CoAP makes the solution inherently lightweight.

In the context of the present disclosure, the expression 'media' may refer to video, audio, animation, images or a combination of different content forms referred generally as multimedia. Although further description of the present disclosure may refer to 'video' streaming, it may be noted that the described application is non-limiting and systems and methods of the present disclosure may be generally applied to other 'media' as well. Furthermore, the expressions 'video producer' and 'producer' may be used interchangeably. Likewise, the expressions 'video consumer' and 'consumer' may be used interchangeably.

FIG. 1 illustrates an exemplary application scenario for systems and methods of the present disclosure. An end-point producing video or video producer 120 may be a constrained device considering the balance between the amount of service that needs to be provided and the amount of energy, memory and processing power that may be available. The video producer 120 may transmit media over a network 110 to a video rendering engine or video consumer 130. Furthermore, the video producer 120 may have to move around in an environment with lossy connectivity marred with frequently intermittent connection. The intermittence may occur both in indoor or in outdoor conditions due to radio impairments through shadowing, destructive interference, etc. and also due to congestion in network. Importantly, an end user of the video may no longer be the human eye; rather it can be some machine intelligence algorithm. Hence, the video gets truly communicated from Thing to Thing.

The Quality of Experience (QoE) considerations of a video rendering unit (video consumer) for applications like Augmented Reality (AR), Visual Simultaneous Localization and Mapping (VSLAM), surveillance using Unmanned Aerial Vehicles (UAV) are also different from traditional applications. While human eye may be insensitive to few milliseconds of deviation in play-out time, machine algorithms may not. Again, while a human brain may tolerate a video freeze for certain duration, a freeze for the same duration may prove catastrophic for machine algorithms like visual VSLAM.

The present disclosure is particularly directed to real-time live streaming protocol for remote vision over Internet which can be used by constrained devices. An Adaptive RESTful Real-time live video Streaming for Things (A-REaLiST) is provided such that it maintains a balance between reliability and delay performance on the fly. The protocol semantics are adapted in real-time, utilizing inference obtained from instantaneous application data segment in flight. While it maintains real-time video play-out deadlines through best effort transfer, it also ensures delivery of critical segments (header information, important metadata, etc.) which may enable an end-application to perform in situ corrections of any impairment due to potential loss of data. This way, while maintaining strict deadlines, it provides necessary hooks to maintain the overall QoE at the application level. By design, A-REaLiST is not disruptive to the existing standard communication method for IoT. A-REaLiST can co-exist with the RESTful architecture for accessing web-services for IoT as well as conventional Internet. A-REaLiST is highly scalable such that it can be used for one-hop streaming over a Wireless Local Area Network (WLAN) (e.g., between a UAV and a video consumer) to streaming across the Internet.

Referring now to the drawings, and more particularly to FIGS. 2 through 14, where similar reference characters denote corresponding features consistently throughout the figures, there are shown preferred embodiments and these embodiments are described in the context of the following exemplary system and method.

Figure 2:
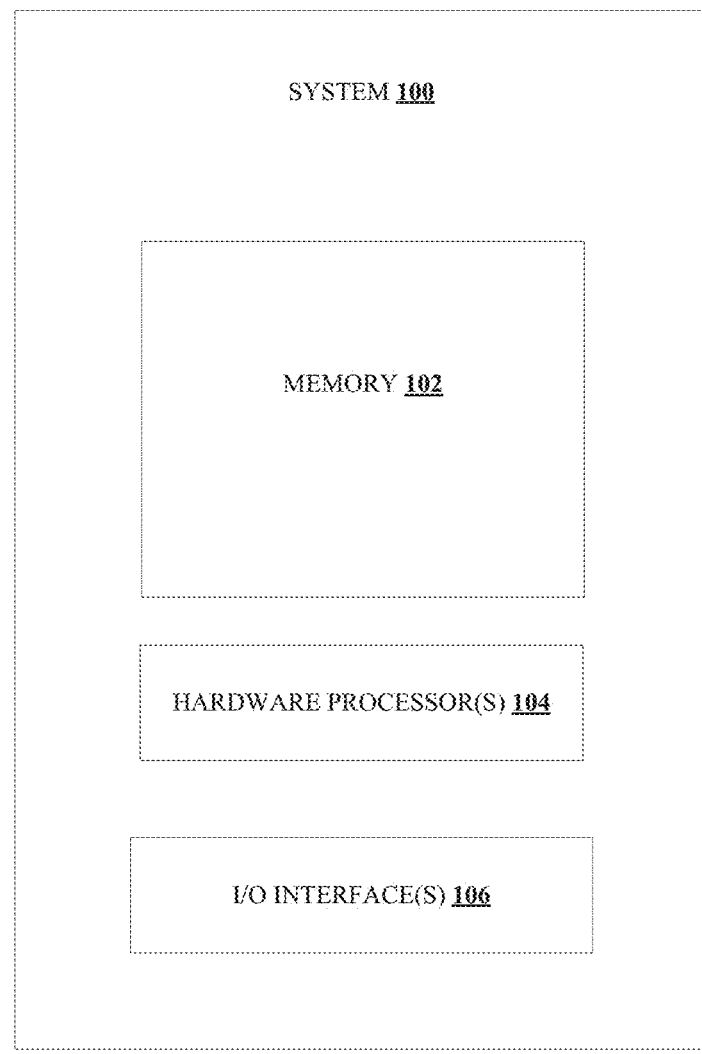
FIG. 2 illustrates an exemplary block diagram of a system for adaptive REpresentational State Transfer (RESTful) real-time live media streaming for Internet of Things (IoT) in accordance with the present disclosure.

FIG. 2 illustrates an exemplary block diagram of a system 100 for adaptive REpresentational State Transfer (RESTful) real-time live media streaming for Internet of Things (IoT), in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104. In an embodiment, the one or more processors may be implemented in the video producer 120 and in the video consumer 130.

Figure 10:
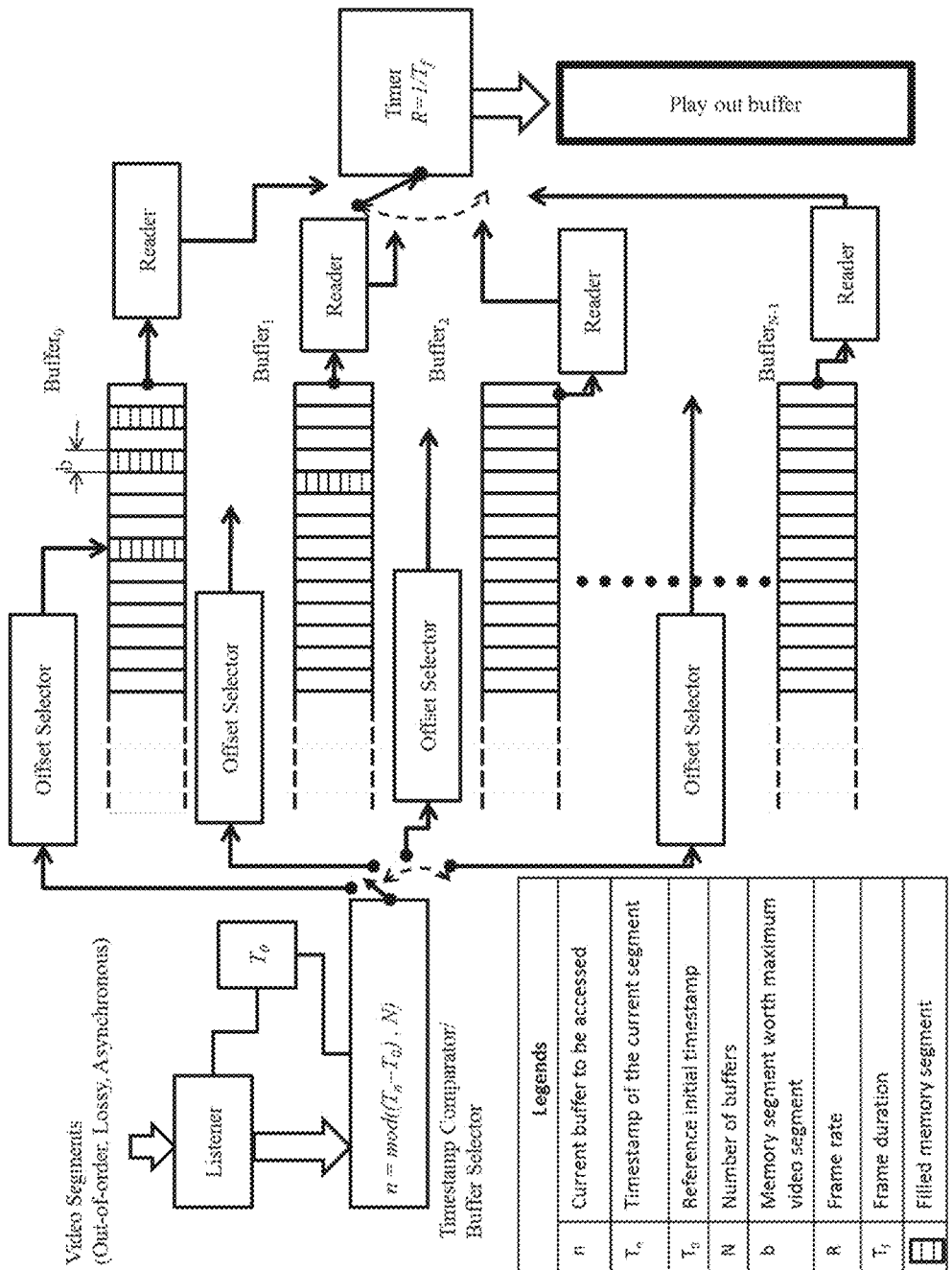
FIG. 10 illustrates an exemplary architecture of a playout mechanism at a video consumer in accordance with an embodiment of the present disclosure.
Figure 11A:
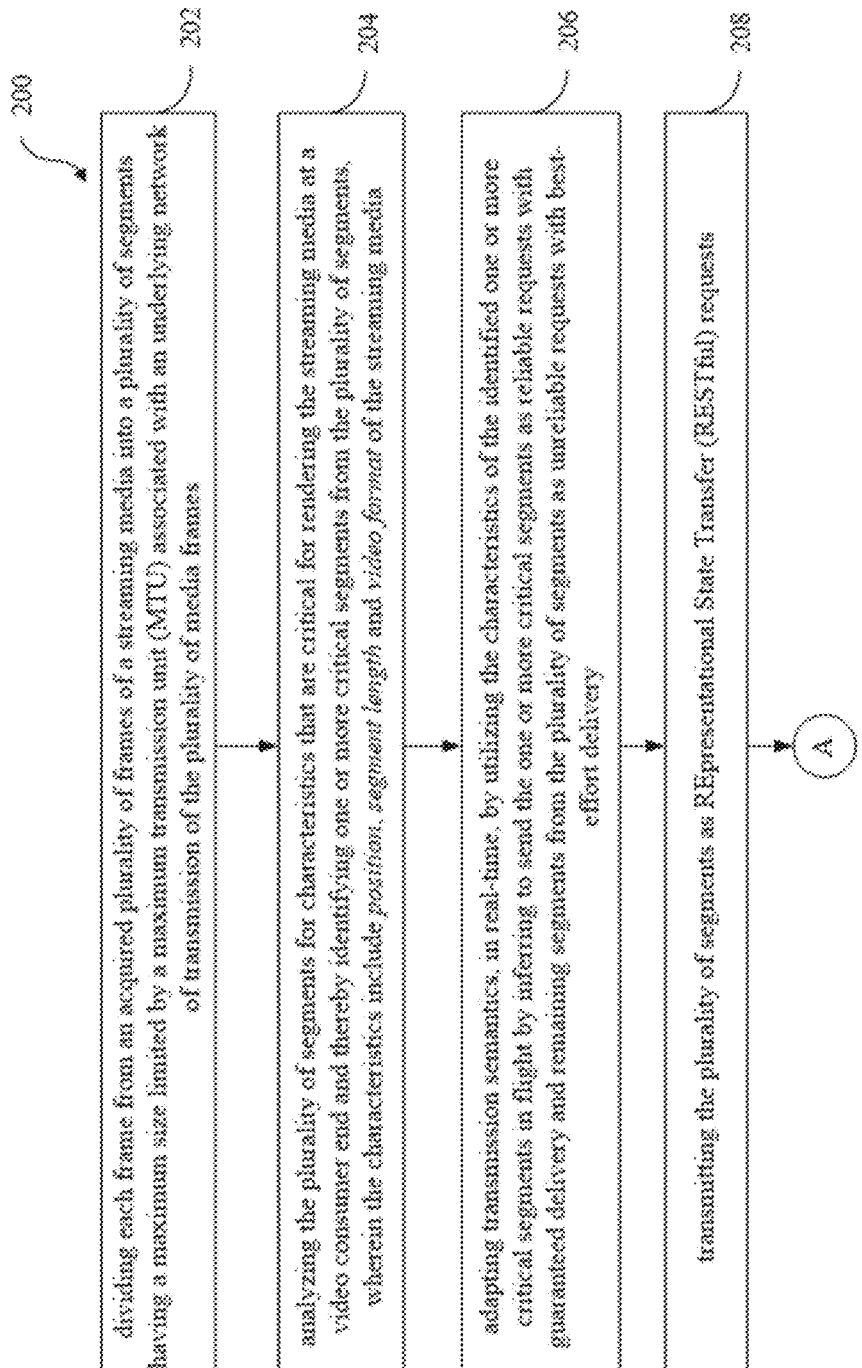
FIG. 11A and FIG. 11B is an exemplary flow diagram illustrating a computer implemented method for adaptive REpresentational State Transfer (RESTful) real-time live media streaming for Internet of Things (IoT), in accordance with an embodiment of the present disclosure.
Figure 11B:
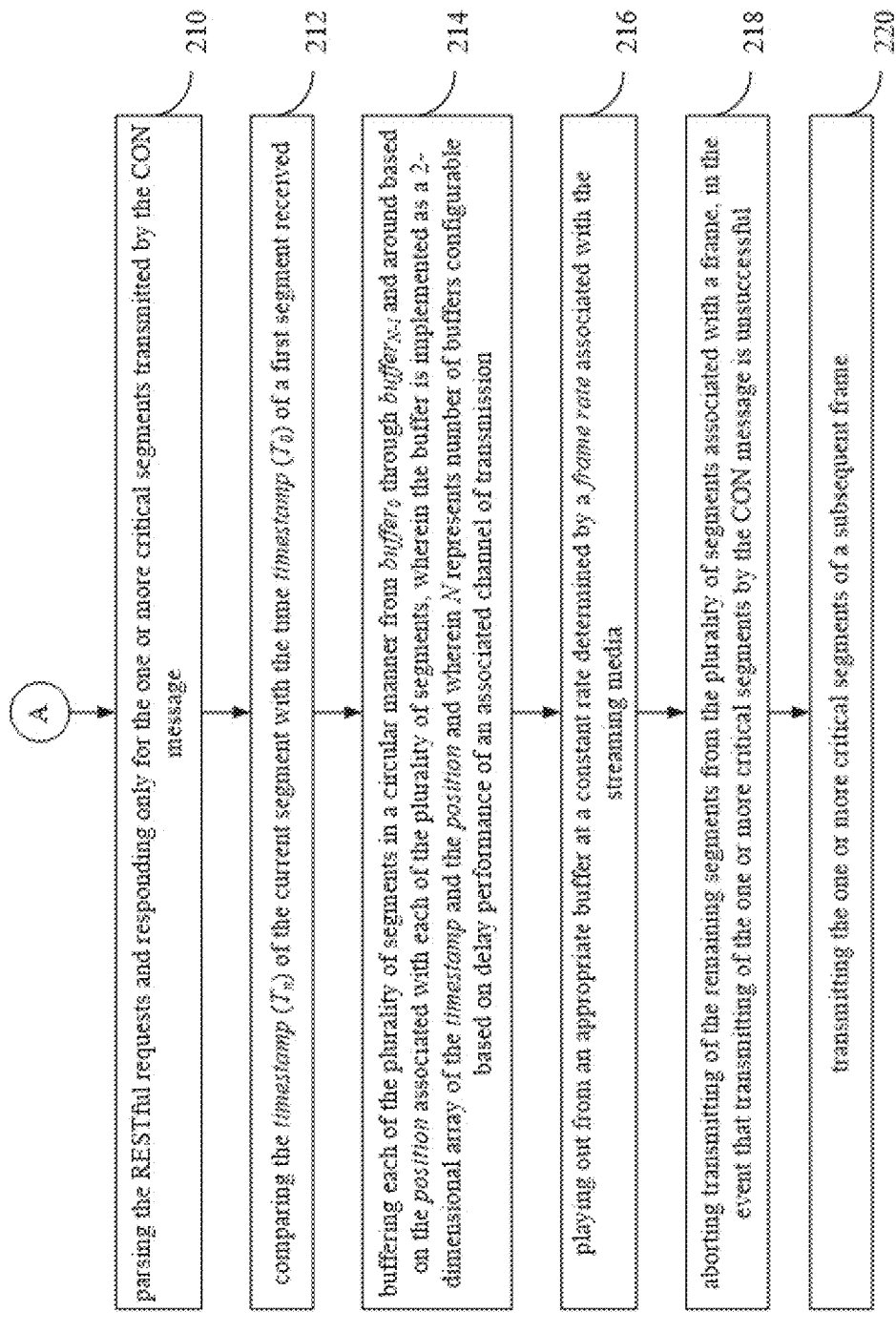

FIG. 11A and FIG. 11B is an exemplary flow diagram illustrating a computer implemented method for adaptive REpresentational State Transfer (RESTful) real-time live media streaming for Internet of Things (IoT), in accordance with an embodiment of the present disclosure. The steps of the method 200 will now be explained in detail with reference to the components of the system 100 of FIG. 2 and FIGS. 3 through 10. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3:
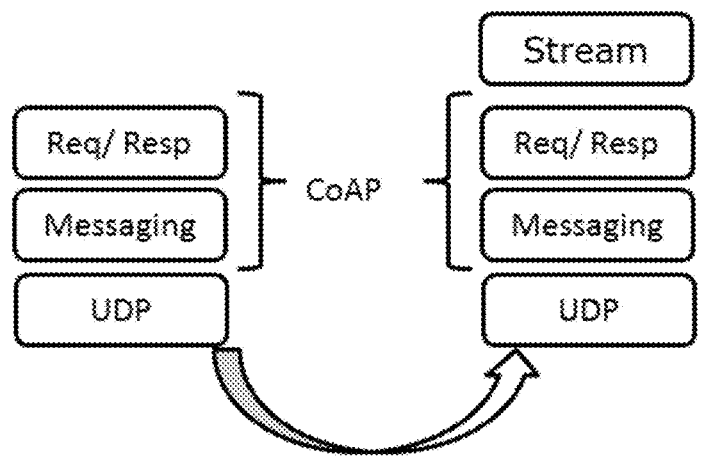
FIG. 3 illustrates a conceptual stream layer to extend functionalities of Constrained Application Protocol (CoAP) for enabling streaming in accordance with an embodiment of the present disclosure.

The protocol of the present disclosure follows an approach similar to progressive download over HTTP. An exemplary implementation may use Constrained Application Protocol (CoAP) as a substrate to build upon. FIG. 3 illustrates a conceptual stream layer to extend functionalities of CoAP for enabling streaming in accordance with an embodiment of the present disclosure. The stream layer is configured to intelligently handle an application payload for streaming and also maintain a stream sequence according to associated timestamps.

Figure 4:
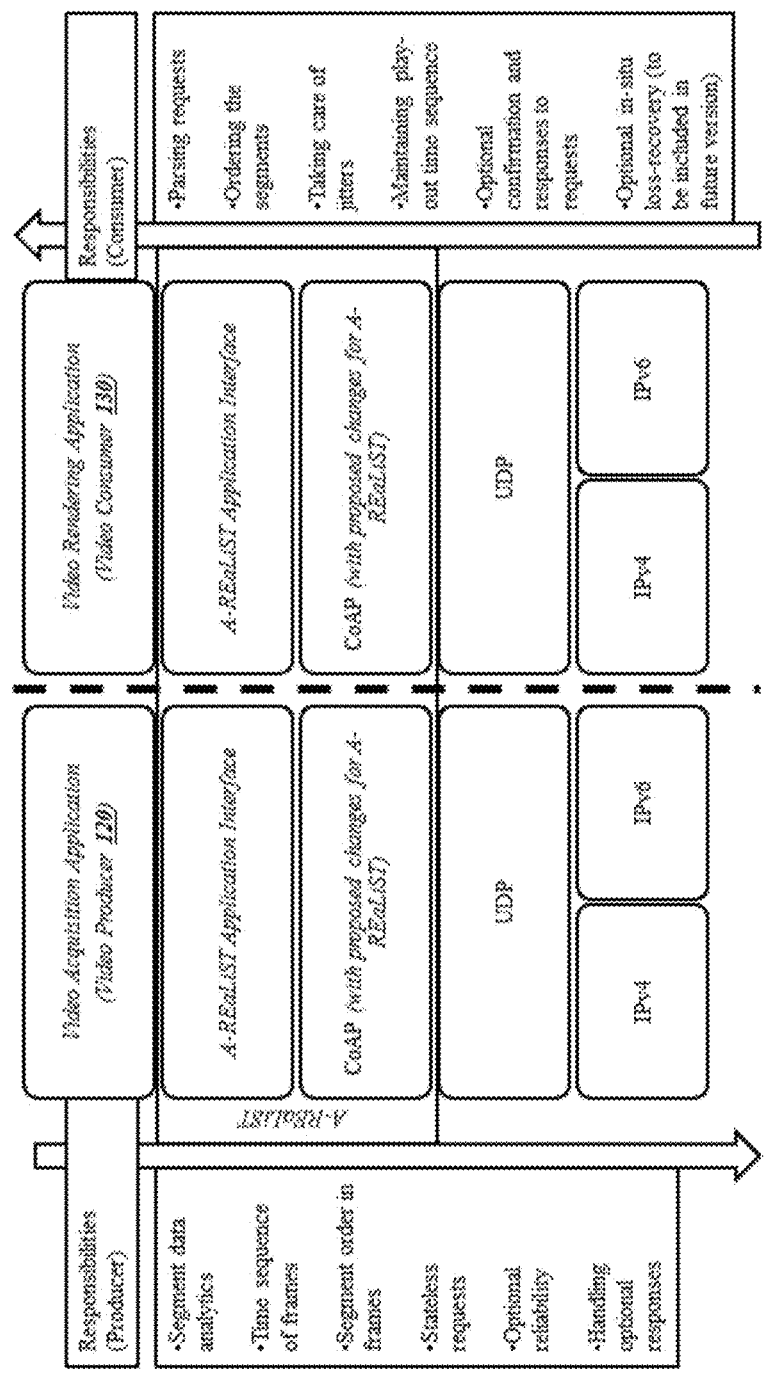
FIG. 4 illustrates an exemplary stack representation of an Adaptive RESTful Real-time live video Streaming for Things (A-REaLiST) in accordance with an embodiment of the present disclosure.

FIG. 4 illustrates an exemplary stack representation of an Adaptive RESTful Real-time live video Streaming for Things (A-REaLiST) in accordance with an embodiment of the present disclosure. In an embodiment of the present disclosure, the video producer 120, is configured to divide each frame from an acquired plurality of frames of a streaming media, at step 202, into a plurality of segments having a maximum size limited by a maximum transmission unit (MTU) associated with an underlying network of transmission of the plurality of media frames. This is to ensure that there is no undesired conversation state at lower layers of the protocol stack due to uncontrolled fragmentation and hence an undesired explosion of traffic in the network. As a standard practice, the application defines a maximum possible segment size which is limited by the MTU. Each of the plurality of segments is transmitted to the video consumer 130 as a RESTful request to a given resource at the video consumer 130. The video producer 120 does not need to maintain any previous encoding state which needs to be re-transmitted to the video consumer 130 as the transaction is stateless.

In an embodiment of the present disclosure, the video producer 120, is configured to analyze the plurality of segments, at step 204, for characteristics that are critical for rendering the streaming media at a video consumer end and thereby identify one or more critical segments from the plurality of segments. In an embodiment the characteristics may include position, segment length and video format of the streaming media.

Figure 5:
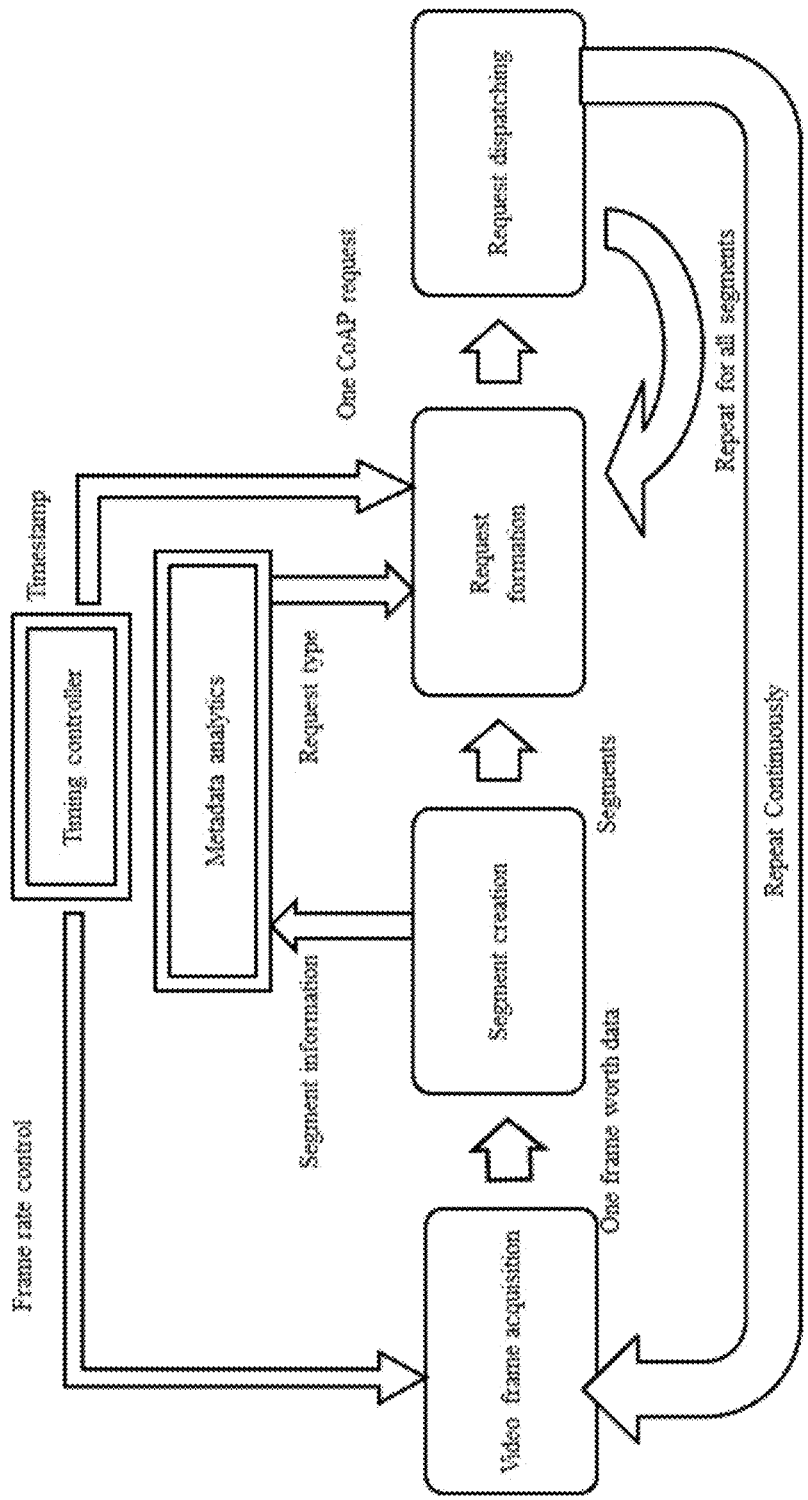
FIG. 5 illustrates exemplary functional blocks and their interactions in the stream layer of a video producer in accordance with an embodiment of the present disclosure.

FIG. 5 illustrates exemplary functional blocks and their interactions in the stream layer of the video producer 120. A block represented as video frame acquisition acquires the plurality of frames of the streaming media that are divided into the plurality of segments at step 202. The blocks represented as timing controller and metadata analytics particularly contribute to the stream layer (FIG. 3) of the present disclosure. The timing controller is configured to control frame rate and maintain time stamp of each frame. The metadata analytics block (explained herein below with reference to FIG. 6) is an intelligent module configured to analyze the plurality of segments, at step 204. The block represented as segment creation is configured to create segments worth transmission or segments within a specified upper limit for the current transmission MTU, wherein the application layer ensures other layer headers do not cross the upper limit over the underlying network. The block represented as request formation forms a RESTful request to be sent to the video consumer 130 based on transmission semantics determined by the metadata analytics block. Also, appropriate options are selected to indicate that the payload contained in the request is part of a video frame with a specific timestamp and whether the request has to be transmitted with reliability (i.e. ACK is required) or a non-reliable request with no response expected from the video consumer 130. The block represented as request dispatching finally dispatches the request to the video consumer 130.

Figure 6:
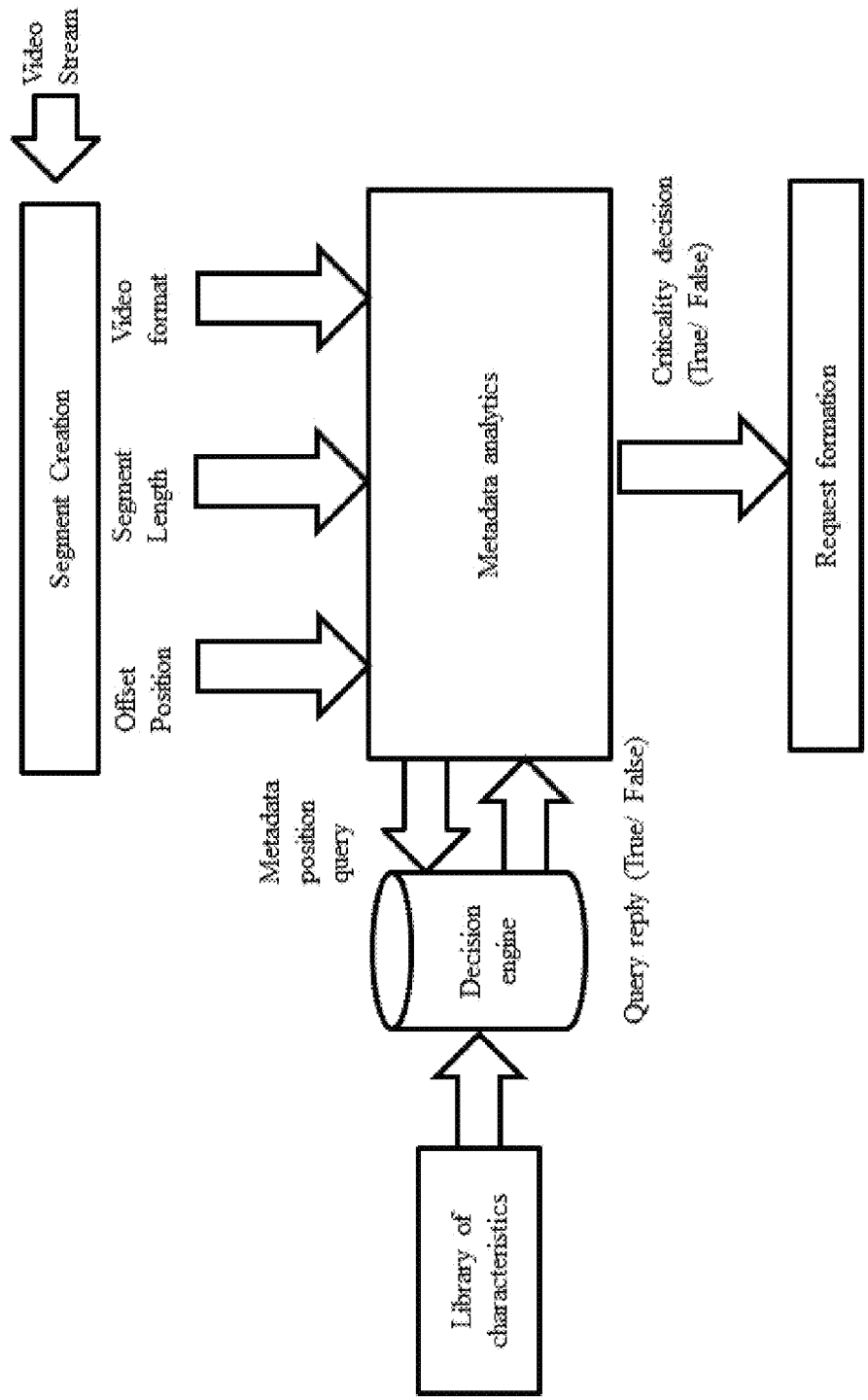
FIG. 6 illustrates interactions of a metadata analytics module in the stream layer of the video producer of FIG. 5.
Figure 7:
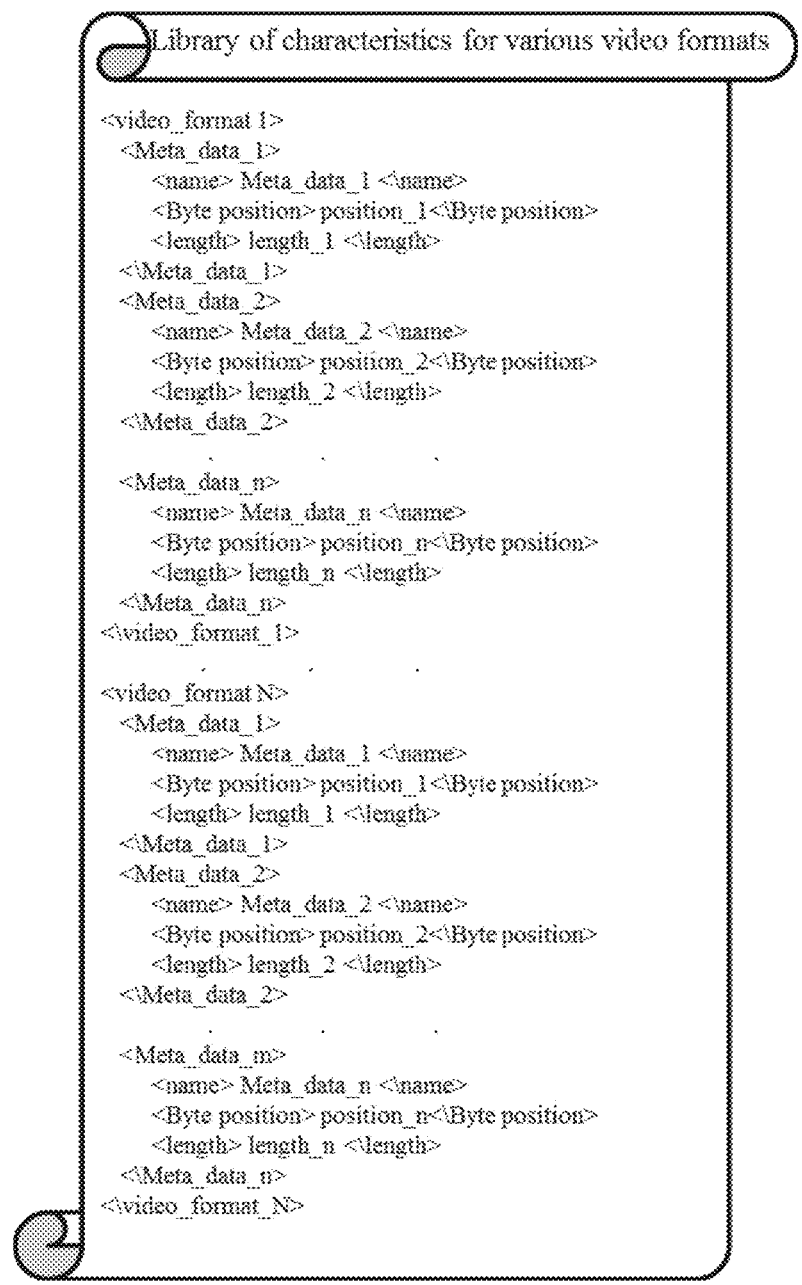
FIG. 7 illustrates an exemplary library of characteristics for various video formats in accordance with an embodiment of the present disclosure.

FIG. 6 illustrates interactions of a metadata analytics module in the stream layer of the video producer of FIG. 5. In accordance with an embodiment of the present disclosure, the step 204 of analyzing the plurality of segments for characteristics that are critical for rendering the streaming media comprises firstly determining the characteristics such as position (offset position), segment length and video format. The determined characteristics are then looked up in a pre-defined library of characteristics for various video formats by a decision engine and compared to identify one or more critical segments based on the comparison. FIG. 7 illustrates an exemplary library of characteristics for various video formats in accordance with an embodiment of the present disclosure. In an embodiment, the library of characteristics defines critical information based on which the one or more critical segments may be identified. For instance, one or more segments having characteristics that map to corresponding characteristics for the same video format in the library of characteristics may be considered critical segments.

In accordance with an embodiment of the present disclosure, the metadata analytics block is further configured to adapt transmission semantics, in real-time at step 206, by utilizing the characteristics of the identified one or more critical segments in flight. The step of adapting transmission semantics comprises inferring to send the one or more critical segments identified in step 204 as reliable requests with guaranteed delivery and remaining segments from the plurality of segments as unreliable requests with best-effort delivery.

In an embodiment of the present disclosure, the one or more critical segments are transmitted by a confirmable (CON) message and remaining segments from the plurality of segments are transmitted by a non-confirmable (NON) message using Constrained Application Protocol (CoAP). In an embodiment the non-confirmable (NON) message is accompanied by a No-Response option to stop any response on the state of the resource after execution of the request at the consumer end, thereby making the whole interaction an open-loop best-effort communication and hence saving computing and communication resources. Unless the video producer 120 or client explicitly mentions its disinterest in getting a response from the video consumer 130 or server (by using the No-Response option in the request), a response to the request API is sent by the video consumer 130 or server.

In an embodiment of the present disclosure, the one or more processors 104 are configured to transmit, at step 208, the plurality of segments as REpresentational State Transfer (RESTful) requests. In accordance with the present disclosure, header options provided to enable streaming on CoAP include:

(i) Stream_info: It is a request option as well as a response option having one or more Least Significant Bits (LSBs) indicating a state of exchange (stream_state) and one or more Most Significant Bits (MSBs) indicating an identifier (stream_id) for the streaming media. In an embodiment, data type associated with the stream_info is 1 unsigned byte with 3 LSBs indicating the state of exchange (stream_state) and 5 MSBs indicating the identifier (stream_id). The identifier is determined by the video producer 120 and remains unchanged for all requests/responses during the streaming. Accordingly, stream_id=stream_info>>3 or stream_id is stream_info right shifted by 3 bits. Also, Stream_state=Stream_info & 0x7. Stream_state bits may be interpreted, in accordance with an embodiments, as:
000=>stream initiation (always with request),
001=>initiation accepted (always with response),
010=>initiation rejected (always with response), 011=>stream re-negotiation (with request or response),
100=>stream ongoing (ii) Timestamp: It is a request option relating to the plurality of segments to a corresponding frame in a play sequence of the streaming media.

In an embodiment, data type associated with timestamp is 32 bit unsigned integer.

(iii) Position (Offset position): It is a request option having one or more MSBs indicating an offset at which a current segment is placed in a frame corresponding to an associated timestamp and one or more LSBs indicating whether the current segment is a last segment of the frame corresponding to the associated timestamp.

In an embodiment, data type associated with the Position is 16 bit unsigned integer with 15 MSBs indicating the offset and 1 LSB indicating whether the current segment is the last segment of the frame. Hence, Last segment= Position &0x01 ? True: False and Offset=(Position>>1). Accordingly, if result of bitwise & is 1, the segment is a last segment and otherwise, if the result is 0.

In accordance with an embodiment of the present disclosure, the step of transmitting the plurality of segments as a Representational state transfer (RESTful) request is either preceded by a handshake or performs a handshake during an ongoing session based on proposed parameters associated with the streaming media, negotiated parameters thereof and either accepting or rejecting of the proposed parameters or the negotiated parameters resulting in initiating transmitting of the streaming media or aborting the streaming media respectively.

Figure 8A:
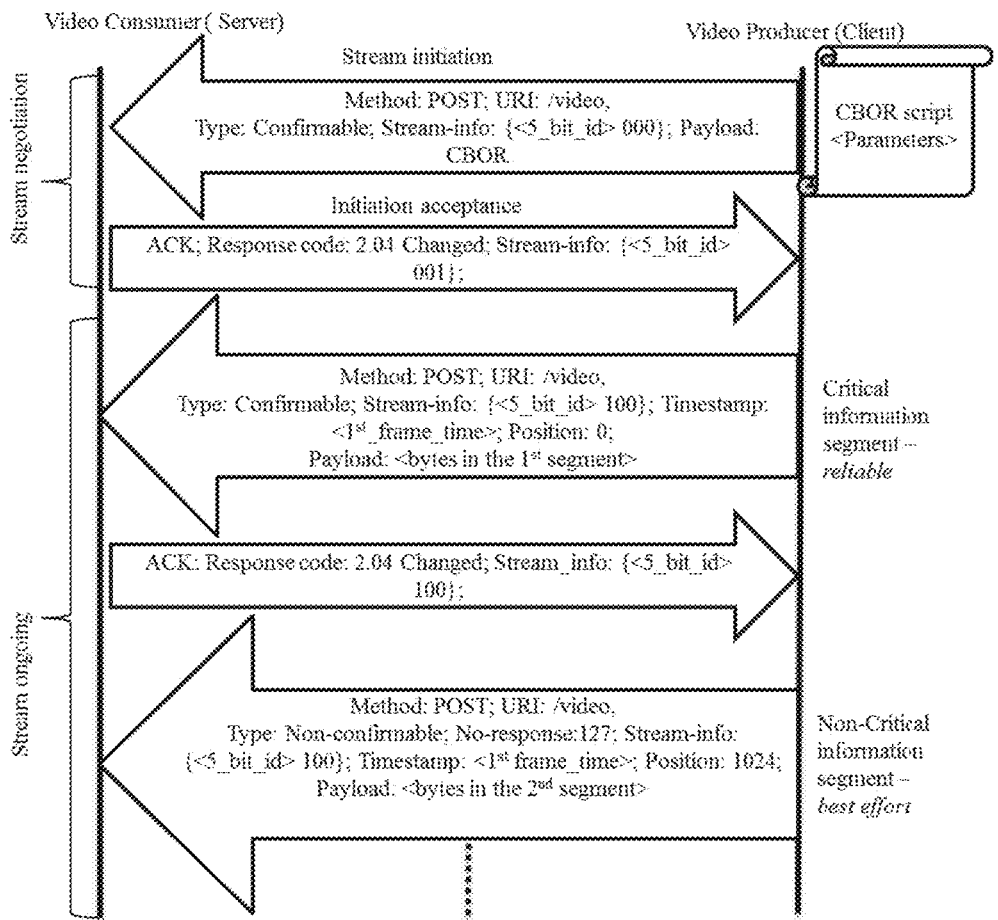
FIG. 8A, FIG. 8B and FIG. 8C illustrate handshake based on parameters of streaming media involving successful negotiation, renegotiation and unsuccessful negotiation respectively of the parameters in accordance with an embodiment of the present disclosure.
Figure 8B:
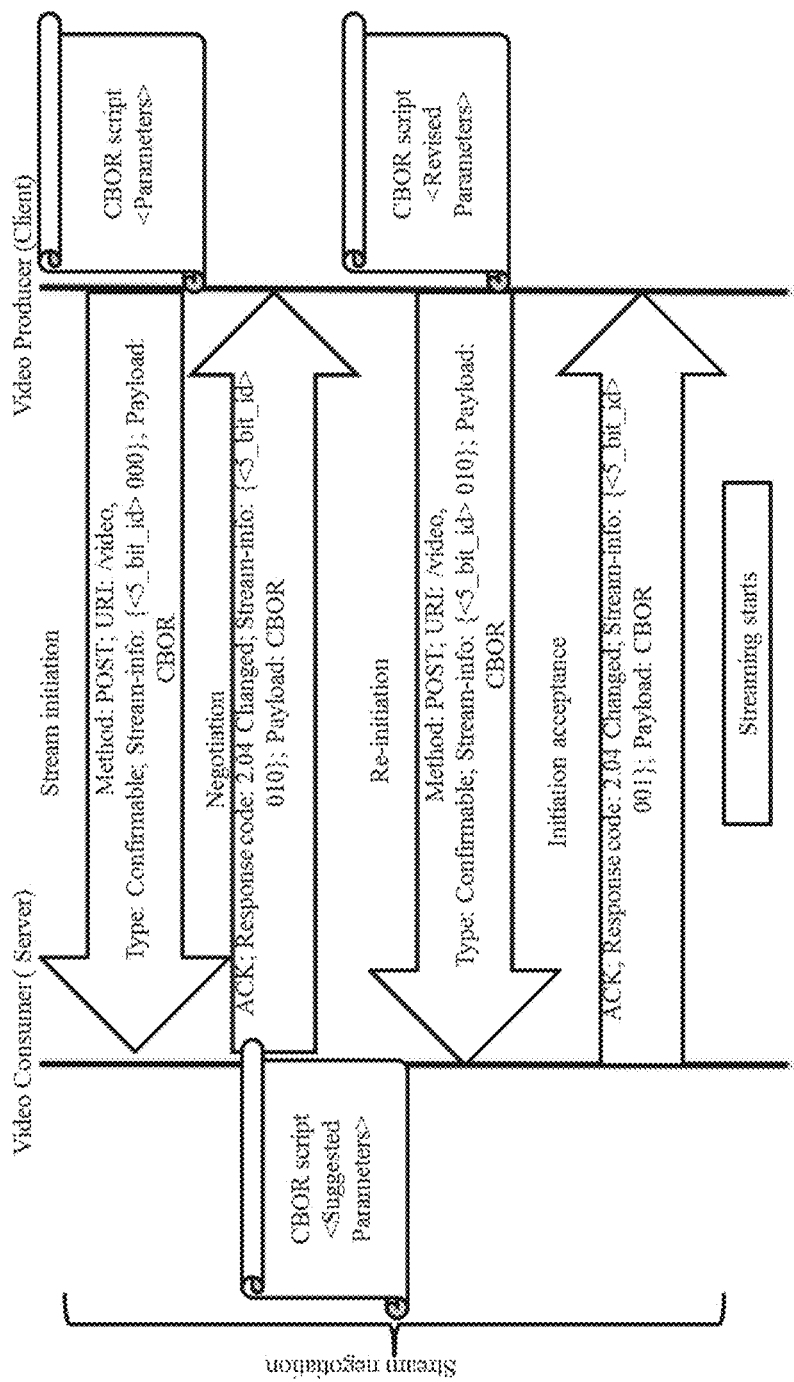
Figure 8C:
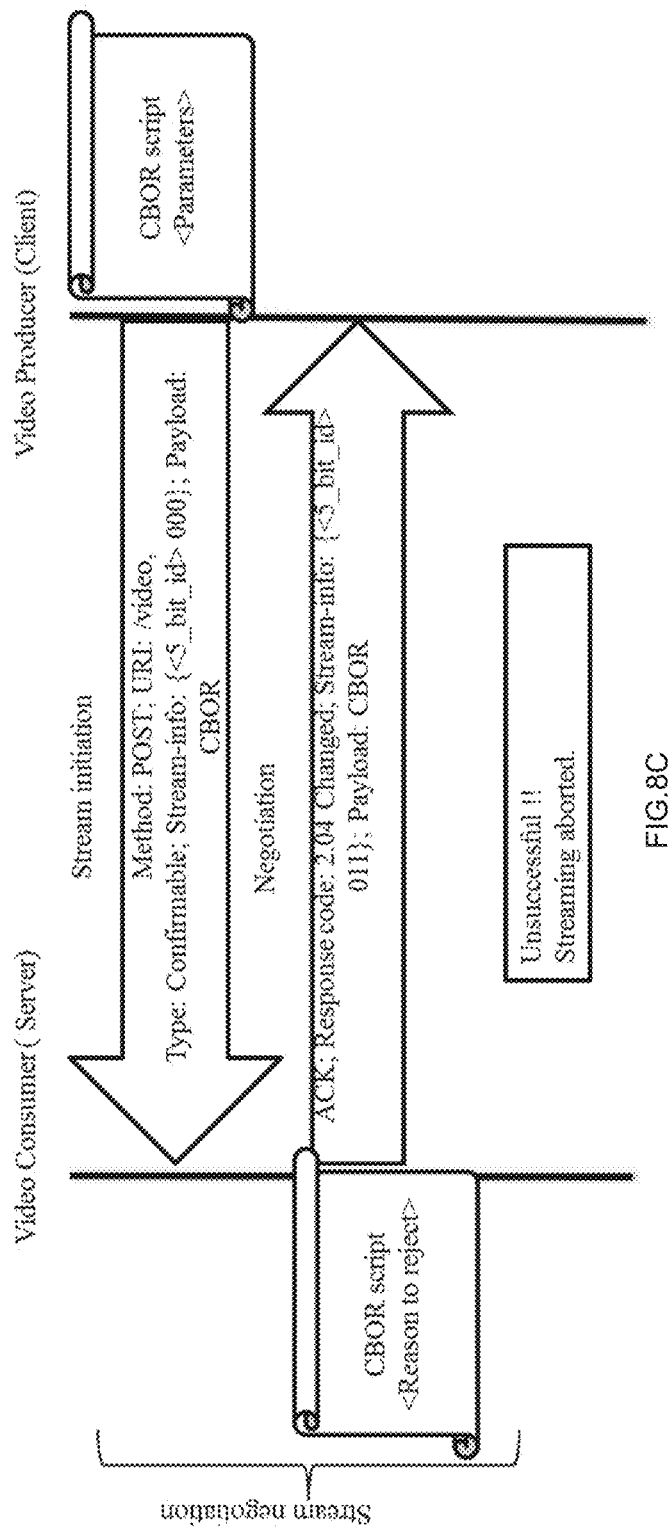

In an embodiment, the proposed parameters may be re-negotiated during the ongoing session. Accordingly, FIG. 8A, FIG. 8B and FIG. 8C illustrate handshake based on parameters of streaming media involving successful negotiation, renegotiation and unsuccessful negotiation respectively of the parameters in accordance with an embodiment of the present disclosure. In an embodiment, the handshake may comprise exchange of commands from the video consumer end such as pause or zoom. The handshake may also comprise control feedback messages such as channel parameters or metrics like Signal-to-Noise Ratio (SNR), power profile, processor statistics and the like.

Figure 9:
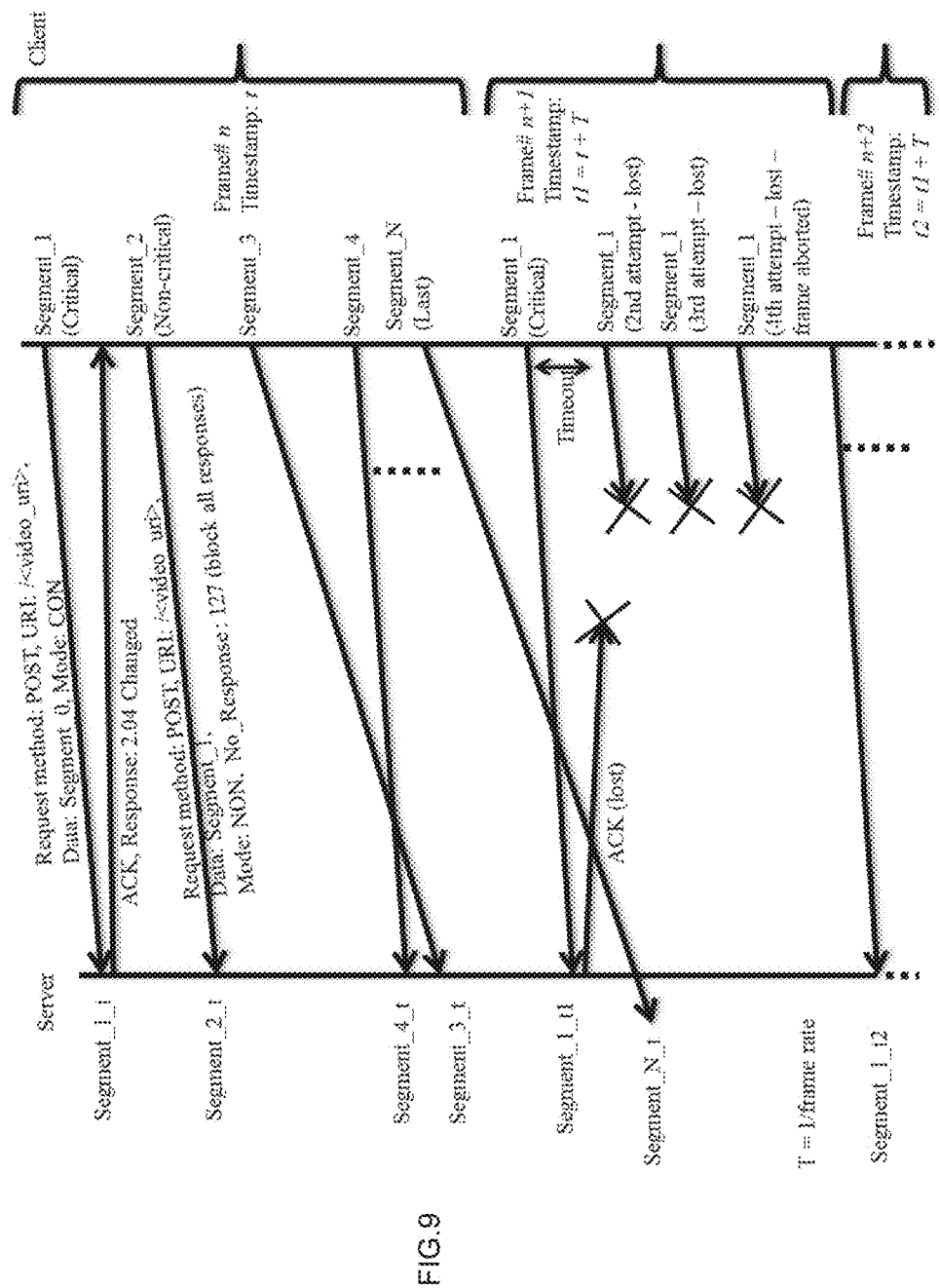
FIG. 9 illustrates an exchange of a video stream through a timing diagram in accordance with an embodiment of the present disclosure.

FIG. 9 illustrates an exchange of a video stream through a timing diagram in accordance with an embodiment of the present disclosure particularly depicting an expected out-of-order delivery and loss. All messages are sent synchronously such that all the segments are transferred in sequential order and the transfer is held till a critical segment is reliably transferred (determined by the receipt of corresponding ACK in the messaging layer and the response from the resource in the Uniform Resource Identifier). In case a critical segment corresponding to a frame could not be delivered despite maximum retransmission attempts, the segments corresponding to the whole frame are dropped from the transmission queue to save the bandwidth. FIG. 9 illustrates streaming behavior in several exemplary scenarios. The first frame is successfully delivered as all the segments reached the destination, but the packets are delivered out-of-order which is to be handled by the server (video consumer). In case of the $2^{nd}$ frame, the $1^{st}$ segment (a critical segment) gets delivered, but soon after the connection is interrupted and the ACK is lost followed by loss of all the retransmissions from the client (video producer) end. So delivery of rest of the segments of the $2^{nd}$ frame is aborted as the video producer could not determine whether the critical segment could be successfully delivered. Then again after the frame duration (T) the video producer attempts to send the next frame at t2. Accordingly, in an embodiment, the video producer 120 may be configured to abort transmitting of the remaining segments from the plurality of segments associated with a frame, at step 218, in the event that transmitting of the one or more critical segments by the CON message is unsuccessful and subsequently transmit the one or more critical segments of a subsequent frame at step 220 thereby enabling congestion control.

As already described, the use of datagram transport has a price in terms of more work (and subsequently more control) by the application. A reliable transport-layer like TCP takes care of orderly delivery of segments with as much reliability as possible. In the present disclosure, though datagram transport is used, reliability is still considered. While the critical segments are delivered reliably, others are delivered with best-effort in an open-loop manner. Also, transmission of the whole frame can be aborted according to the method of the present disclosure. Hence, the application at the consumer end-point (server) deals with issues like out-of-order delivery, frame/segment loss, asynchronous segment arrival.

FIG. 10 illustrates an exemplary architecture of a playout mechanism at the video consumer 130 in accordance with an embodiment of the present disclosure. On a high level, the video consumer 130 is configured to collect the plurality of segments transmitted by the video producer 120, order them to form a frame and display the frames at the respective frame boundaries. Key functional blocks constituting the video consumer 130 in accordance with an embodiment are explained hereinafter. A listener may be configured to parse the RESTful requests, at step 210, and respond only for the one or more critical segments transmitted by the CON message. A time stamp comparator may be configured to compare, at step 212, the timestamp ($T_n$) of the current segment with the time timestamp $T_0$ of a first segment received. At step 214, each of the plurality of segments may be buffered in a circular manner from instantaneous buffers buffer$_0$ through buffer$_{N-1}$ and around based on the position associated with each of the plurality of segments, wherein the buffer is implemented as a 2-dimensional array of the timestamp and the position and wherein N represents number of buffers configurable based on delay performance of an associated channel of transmission. An offset selector may read the offset for the segment mentioned in the current request and places the segment in a right order in an instantaneous buffer for the timestamp mentioned in the request. A buffer reader reads the instantaneous buffer to be played out at a given timestamp. A frame rate time determines when it is time to read the instantaneous buffer into a play out buffer and invokes the concerned buffer reader. At step 216, the play out buffer plays out from the appropriate buffer at a constant rate determined by a frame rate associated with the streaming media. Thus the present disclosure adopts the design philosophy of buffering till a critical time to iron out the jittery, out-of-order arrival of the segments, playing out from the appropriate buffer at a constant rate determined by the frame-rate of the video.

In accordance with the present disclosure, the architecture of the playout mechanism at the video consumer 130 leverages on the design assumption about the 'less-constrained' nature of the video consumer 130 in terms of memory and processor. The buffers are implemented using arrays instead of linked list in order to reduce time complexity in searching and sorting. N buffers (0 to N−1) are maintained and is mapped to a given timestamp of the video frames based on the following relation:

$$n = \mod((T_n - T_0), N) \qquad (1)$$

wherein n is the instantaneous buffer number to which the current segment is to be put at an offset as defined by the option in the POST request; $T_n$ is the time stamp of the frame to which the current segment belongs and is derived from the option of the POST request. $T_0$ is the reference timestamp of the video from where the consumer started its local time reference. N is the number of buffers kept at the video consumer 130 end. Thus the architecture allows buffering of up to N−1 out-of-order frame at any given play-out interval. The exact figure of N and the initial buffering time $T_{init-buff}$ can be determined based on the probability distribution of the difference between the expected order and the actual arrival order of the segments for a typical channel. Accordingly, the following relation maybe defined:

$$(N, T_{init-buff}) \rightarrow f(x) = P(0 \le x \le T_{max-spread}) \quad (2)$$

wherein $T_{max-spread}$ is the maximum possible deviation in the arrival order of a typical segment in flight. The selection of play-out buffer is performed at a fixed interval of $T_f$, i.e., frame duration, starting from $T_{start}$ which is a starting reference time for play-out as per the local clock of the video consumer 130. The buffer to be played out at a given instant is determined by the following relation:

$$m = \mod\left(\frac{T_{now} - T_{start}}{T_f}, N\right) \quad (3)$$

It is implicit that if the clocking for the play-out is maintained at strictly constant interval of $T_f$, then $$(T_{now} - T_{start}) = kT_f \{k=0,1,1,\ldots \infty\}$$

Systems and methods of the present disclosure apply an intelligent, robust yet undisruptive approach to balance real-time performance with reliability through adaption of the core protocol semantics for a better QoE and optimum usage of resources. Video transfer is initiated by the video producer 120 which acts as the client as per the request/response semantics. This is to facilitate in situations like remote surveillance using energy constrained video producer. For instance, surveillance Unmanned Aerial Vehicle (UAV) streams the video to a fixed infrastructure. There may be situations such that, each time a UAV is low on resources (energy), a new UAV with full energy is commissioned. It becomes a clumsy design if the consumer has to re-initiate the video request again and again. It makes things simple if the video producer directly starts its job and keeps transferring to the fixed infrastructure. It can be easily configured to determine whether the video consumer is up and watching by observing the responses to the requests which are delivered using CON message and without the No-Response option. Each request acts as an update on a given URI at the video consumer (server) using the POST API. The response payload to POST can be used to transfer several control information from the server end to the client (video producer) end.

Experimental Analyses

Implementation of A-REaLiST in accordance with the present disclosure: The proof-of-concept of A-REaLiST is implemented on top of a Californium (Cf) stack version 1.0.5 which is a plug-tested implementation of both CoAP server and client. However, the No-Response option for CoAP is not implemented in Californium at the time of writing this paper. Therefore a basic No-Response option has been implemented on top of Cf along with the Stream layer and the CoAP header options of the present disclosure. A video producer application is created on top of Cf client which supplies the underlying stack with a series of MJPEG frames. The frames can be streamed either as stored video from the local storage or as live capture from an attached camera. A video consumer application is created on top of a dedicated resource for video at the Cf server to render the MJPEG frames at a constant play-out interval equal to the frame boundaries.

The Experimental Approach for Performance Comparison: The performance is compared against a MJPEG-on-HTTP implementation which is a standard way to send video to a browser and has been used in many product solutions for real-time surveillance. The experiments are conducted to analyze the performance, under different loss and bandwidth settings, in terms the efficiency in network resource consumption and also in terms of the objective parameters on visual impact.

Implementation of the state-of-art: A Hyper Text Transfer Protocol (HTTP) client-server system is created as a reference state-of-the-art solution. It is to be noted that in this case the video producer is the server and the video consumer is the client. The client initiates the request for video content over an HTTP GET request. The server responds to the GET request by transferring chunks of video data as stream of data-segments on TCP socket. Underlying TCP layer takes care of an orderly and reliable delivery of the segments. The client displays the accumulated chunks in a frame when it gets an End-of-frame marker after parsing a chunk. The client is created on Python using OpenCV. The client application can display as well as store the receive frames. The HTTP server is implemented also on Python using the Flask Web-development framework.

Method for comparing bandwidth efficiency: First a generic set of experiments are conducted to establish that the bandwidth efficiency of the underlying core protocols is better under varying network conditions with different losses and bandwidths in an emulated, controlled environment. Considering the additional implementation performed here, the bandwidth efficiency obtained here is significant. No visualization aspects are considered in these experiments. MJPEG frames are transmitted at constant rates from the video producer to the video consumer.

The bandwidth of the network is configured for 512 Kbps to 8 Mbps to cover the spectrum of broadband channel starting from connection over in an indoor WiFi to different configurations over the Internet. For each bandwidth, the performance was tested for a combination of random and bursty packet losses resulting into overall application to application packet loss values of 2%, 5%, 10%.

The following metrics are defined to perform the quantitative comparisons. Let, over a duration of t sec of observation,
$I_P$=Actual information bytes sent from the producer; $B_P$=Total bytes exchanged at the (Network Interface Card) NIC of producer; $I_C$=Actual information bytes received at the consumer; $B_C$=Total bytes exchanged at the NIC of consumer; $B_{PTx}$=Total bytes transmitted from the NIC of producer; $B_{CTx}$=Total bytes transmitted from the NIC of consumer.
Producer Side Efficiency $(E_P) = I_P/B_P$;
Consumer Side Efficiency $(E_C) = I_C/B_C$;
Overall Network Goodput $(G) = I_C/t$ bytes per second.
The $E_P$, $E_C$ are represented in percentage figures and G in kbps (Kilo Bytes per Second) in the furnished results.

Method for comparing visual aspects: Quantifying the visual quality for a video (considering human participant) is very difficult as it is largely subjective. As per the guideline from ITU, this can be conducted through Mean Opinion Score (MOS) based on the observations from designated experts. This is a cumbersome process. Alternatively there are several metrics which can be considered as objective factors that quantitatively indicate the quality of the visual experience. Hence following parameters have been observed for the comparative analyses:

PSNR=>Peak Signal to Noise Ratio; Indicates the amount of frame-to-frame error between the source and destination; also an indicator of loss in the network and impairment as per visual perception.

Frame Reception Ratio $(F)=>F_C/F_P$; $F_C$=Number of video frames actually received at consumer, $F_P$=Number of video frames transmitted at the producer; indicates the amount of loss in the network reflected in the video frames.

Overall Network Efficiency $(E)=>T_C/(B_{PTx}+B_{CTx})$. Here, $T_C$ is the total size of the frames received at the consumer.

In a typical system the losses typically occurring in bursts and video transmission is highly sensitive to burst loss as many packets get lost during the burst interval leading to loss of frames. The primary design target of A-REALiST is to maintain a graceful performance under intermittent connectivity. So, the solution needs to be tested under a condition which would have a deterministic interval of intermittence. However, the exact loss pattern would depend on the typical application scenario and that itself calls for a rigorous work in order to practically parameterize the loss pattern in the network. For the purpose of this publication, a typical scenario is considered and the loss conditions are derived which can be deterministically emulated in the network under test. The emulated network is configured to undergo a few cycles of small burst of losses with the pattern $\{T_{No-Loss}, T_{Loss}\}$ where $T_{Loss}\approx 3$ s, $T_{No-Loss}\approx 80$ s. This emulates a situation when a remote robotic eye, while streaming the live video, is frequently passing through small zones without radio coverage and thereby causing intermittent connectivity.

The experimental setup: Two R-Pi camera modules are used as video producers for A-REaLiST and HTTP-streaming respectively. A computer becomes the video consumer (client for HTTP and server for A-REaLiST). Another computer is made a router equipped with multiple interfaces and is used to emulate an end-to-end application channel. The underlying network has an MTU of 1500. So the maximum segment size for A-REaLiST was chosen as 1024 bytes. In case of HTTP streaming there is no control at the application layer to choose the segment size. TCP takes care of it by ensuring that the full capacity of the MTU is utilized. So, in case of A-REaLiST, there remains some unutilized capacity in an MTU. A test MJPEG stream is transmitted from the producer at 5 frames/second. NetEm available in public domain is used to control the channel behavior as per the planned loss and bandwidth settings. The environment for testing the visual aspects is created through simple shell scripts to automatically modify the NIC properties according to the specific pattern over time through changing the NetEm configuration on the fly. No random delay is applied in order to maintain identical conditions for benchmarking. Wireshark available in public domain is used to capture traffic statistics both at the consumer and at producer. Moscow State University (MSU) Video Quality Measurement Tool available in public domain is used to get the metrics for visual impact. The experiments are repeated several times with deterministic settings to produce average results.

Figure 12A:
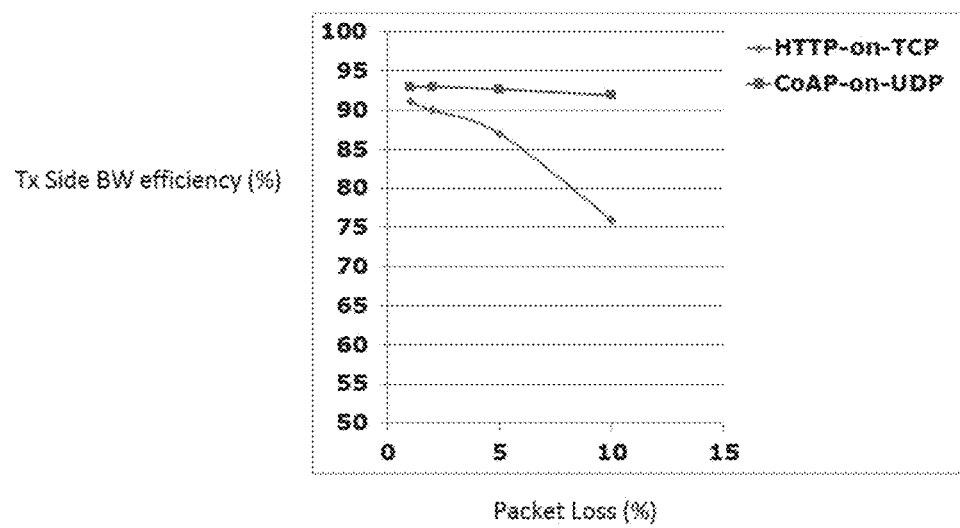
FIG. 12A, FIG. 12B and FIG. 12C illustrate results on bandwidth efficiency under 512 Kbps bandwidth and different % packet-loss conditions.
Figure 12B:
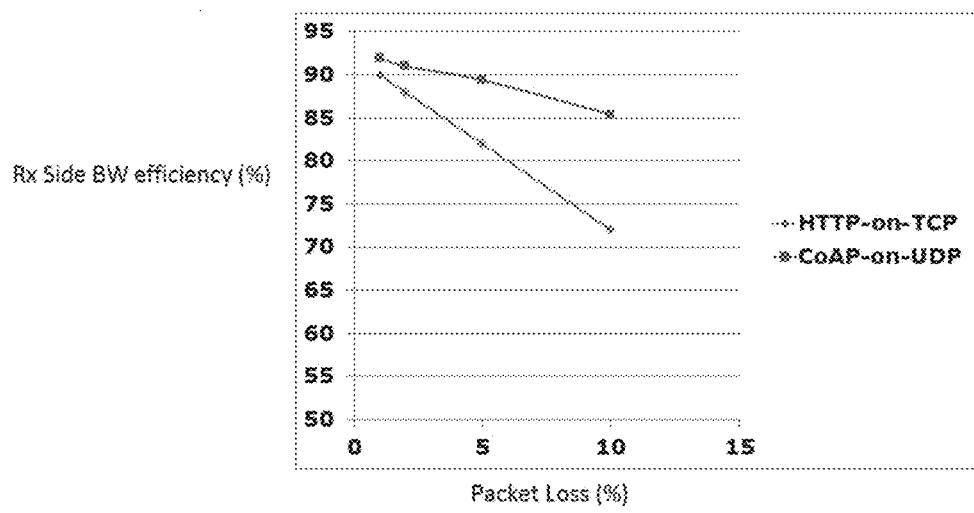
Figure 12C:
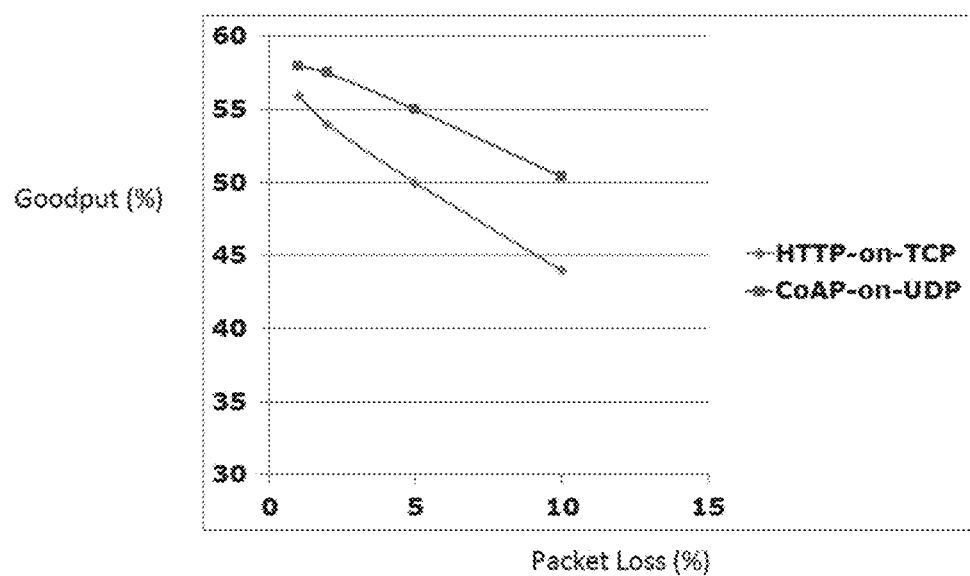
Figure 13A:
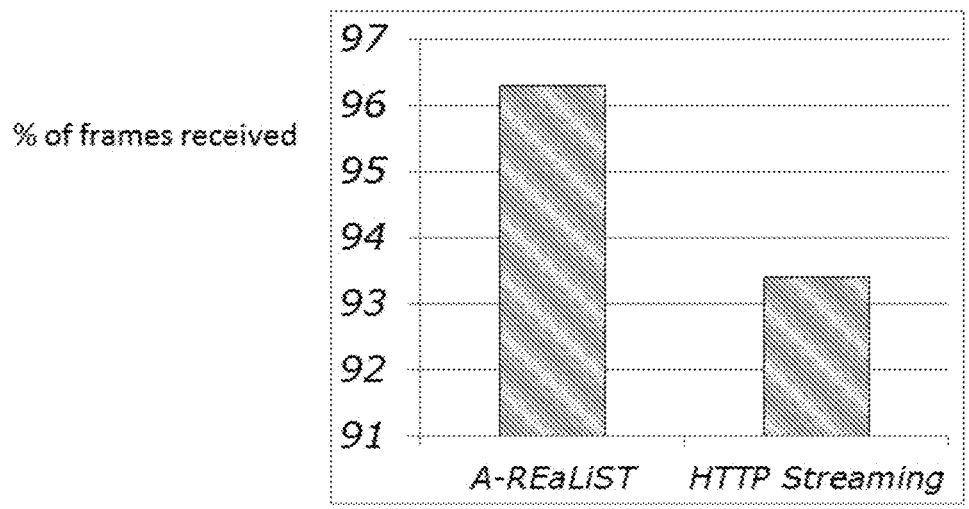
FIG. 13A, FIG. 13B and FIG. 13C illustrate results corresponding to experiments on visual aspects pertaining to percentage of frames received, PSNR of the received frames and bandwidth efficiency in terms of total size of the received frames against the total amount of bytes exchanged in the network respectively.
Figure 13B:
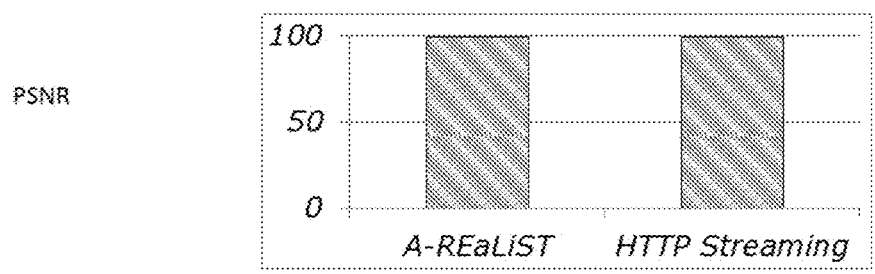
Figure 13C:
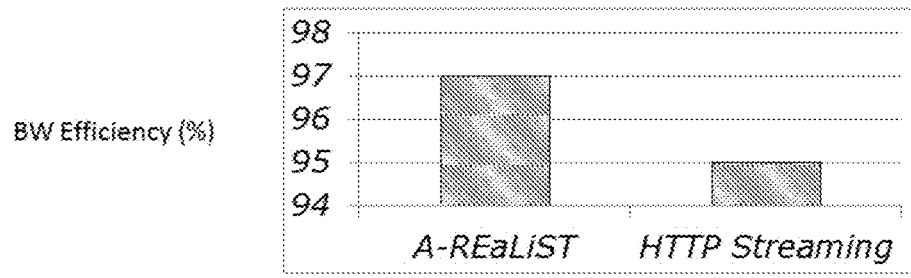

Results and Analysis: FIG. 12A, FIG. 12B and FIG. 12C illustrate results on bandwidth efficiency under 512 Kbps bandwidth and different % packet-loss conditions and FIG. 13A, FIG. 13B and FIG. 13C illustrate results corresponding to experiments on visual aspects pertaining to percentage of frames received, PSNR of the received frames and bandwidth efficiency in terms of total size of the received frames against the total amount of bytes exchanged in the network respectively. It is observed that A-REaLiST outperforms HTTP-streaming in all the parameters under a fixed period of observation. As can be seen, despite the losses the producer side efficiency ($E_P$) remains fairly steady for A-REaLiST. This is due to the fact that the amount of retransmissions is limited only to segments carrying critical information. In these experiments, the segments carrying the frame meta-data have been treated as critical. Rest of the segments is sent as a best-effort by using NON messages with No-response option. In case of HTTP-streaming, the overall header overhead is more than a request/response in A-REaLiST.

The consumer end shows a dip in efficiency for both HTTP-streaming and A-REaLiST with increasing loss. However, A-REaLiST is always better. The dip for A-REaLiST is expected as it does not try to recover loss for everything unlike HTTP-streaming. However, it is still better than HTTP-streaming since the underlying TCP state machine adds the overhead for HTTP-streaming with a very conservative congestion control mechanism which deteriorates the throughput. In accordance with the present disclosure, A-REaLiST responds to losses by a congestion avoidance mechanism as stated in step 220 herein above.

It may be noted that the resultant goodput essentially reflects the actual information rate in the channel over a given period of time. It is clearly reflected that though HTTP-streaming attempts to recover the lost information, it does not actually improve the information rate due to the overhead in recovery process while A-REaLiST intelligently balances between reliability and latency. This is an important aspect for live streaming for delay-tolerant applications like video, especially in cases where an application running some machine intelligence algorithm is the end-consumer of the video.

From the results corresponding to the visualization experiments described herein above, it is seen that the PSNR of the received frames (FIG. 13B) are 100% for both HTTP-streaming and A-REaLiST. This is quite expected. HTTP-streaming always ensures reliability. However, FIG. 13A reveals, the ratio of frames received is 3% higher in A-REaLiST and bandwidth efficiency in A-REaLiST is about 2% higher than HTTP-streaming. All these arguments are in sync with the inference drawn from the results in FIG. 12A, FIG. 12B and FIG. 12C.

Figure 14:
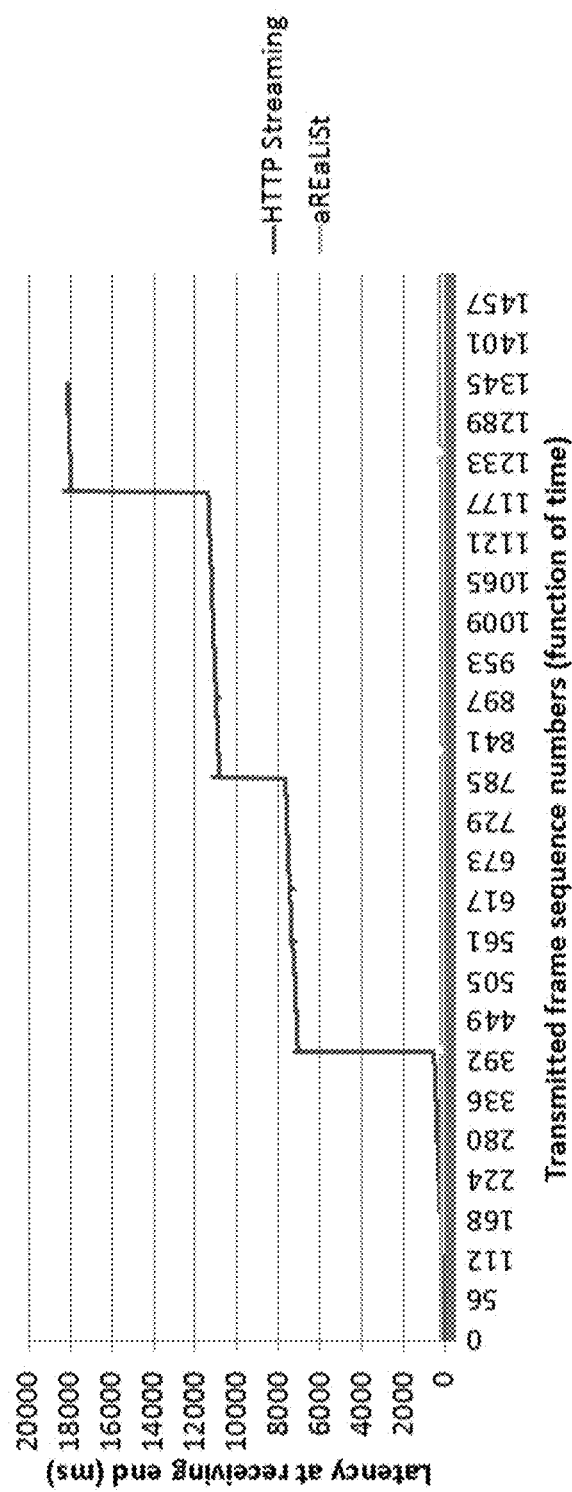
FIG. 14 illustrates frame-by-frame latency comparison to show the real-time performance in accordance with an embodiment of the present disclosure.

FIG. 14 illustrates frame-by-frame latency comparison to show the real-time performance in accordance with an embodiment of the present disclosure. HTTP-streaming is seen attempting to recover lost segments and eventually ends up lagging far behind the real-time deadline.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (200) comprising:
    dividing, by one or more processors, each frame from an acquired plurality of frames of a streaming media into a plurality of segments having a maximum size limited by a maximum transmission unit (MTU) associated with an underlying network of transmission of the plurality of media frames (202);
    analyzing, by the one or more processors, the plurality of segments for characteristics that are critical for rendering the streaming media at a video consumer end and thereby identifying one or more critical segments from the plurality of segments, wherein the characteristics include position, segment length and video format of the streaming media (204);
    adapting transmission semantics, by the one or more processors, in real-time, by utilizing the characteristics of the identified one or more critical segments in flight by inferring to send the one or more critical segments as reliable requests with guaranteed delivery and remaining segments from the plurality of segments as unreliable requests with best-effort delivery (206); and
    transmitting, by one or more processors, the plurality of segments as REpresentational State Transfer (RESTful) requests (208), wherein the one or more critical segments are transmitted by a confirmable (CON) message and the remaining segments from the plurality of segments are transmitted by a non-confirmable (NON) message using Constrained Application Protocol (CoAP), and wherein the non-confirmable (NON) message is accompanied by a No-Response option.

2. The processor implemented method of claim 1, wherein the step of transmitting the plurality of segments as the RESTful request comprises utilizing CoAP with header options including:
    (i) Stream_info being a request option as well a response option having one or more Least Significant Bits (LSBs) indicating a state of exchange (stream_state) and one or more Most Significant Bits (MSBs) indicating an identifier (stream_id) for the streaming media;
    (ii) Timestamp being a request option relating to the plurality of segments to a corresponding frame in a play sequence of the streaming media; and
    (iii) Position being a request option having one or more MSBs indicating an offset at which a current segment is placed in a frame corresponding to an associated timestamp and one or more LSBs indicating whether the current segment is a last segment of the frame corresponding to the associated timestamp.

3. The processor implemented method of claim 2, wherein data type associated with the header options is 1 unsigned byte for the stream_info with 3 LSBs indicating the state of exchange (stream_state) and 5 MSBs indicating the identifier (stream_id); the data type associated with the timestamp is 32 bit unsigned integer; and the data type associated with the position is 16 bit unsigned integer with 15 MSBs indicating the offset and 1 LSB indicating whether the current segment is the last segment of the frame.

4. The processor implemented method of claim 2, wherein the step of analyzing the plurality of segments for characteristics that are critical for rendering the streaming media comprises:
determining the characteristics including position, segment length and video type of the streaming media;
comparing the determined position and segment length associated with the determined video format with corresponding characteristics in a pre-defined library of characteristics for various video formats; and
identifying one or more critical segments based on the comparison.

5. The processor implemented method of claim 4 further comprising:
parsing, by the one or more processors, the RESTful requests and responding only for the one or more critical segments transmitted by the CON message (210);
comparing, by the one or more processors, the timestamp (Tn) of the current segment with the time timestamp T0 of a first segment received (212);
buffering, by the one or more processors, each of the plurality of segments in a circular manner from buffer0 through bufferN−1 and around based on the position associated with each of the plurality of segments, wherein the buffer is implemented as a 2-dimensional array of the timestamp and the position and wherein N represents number of buffers configurable based on delay performance of an associated channel of transmission (214); and
playing, by the one or more processors, out from an appropriate buffer at a constant rate determined by a frame rate associated with the streaming media (216).

6. The processor implemented method of claim 5, further comprising:
aborting, by the one or more processors, transmitting of the remaining segments from the plurality of segments associated with a frame, in the event that transmitting of the one or more critical segments by the CON message is unsuccessful (218); and
transmitting, by the one or more processors, the one or more critical segments of a subsequent frame (220).

7. The processor implemented method of claim 1, wherein the step of transmitting the plurality of segments as a Representational state transfer (RESTful) request is either preceded by a handshake or performs a handshake during an ongoing session based on proposed parameters associated with the streaming media, negotiated parameters thereof and either accepting or rejecting of the proposed parameters or the negotiated parameters resulting in initiating transmitting of the streaming media or aborting the streaming media respectively.

8. The processor implemented method of claim 7, wherein the handshake comprises exchange of at least one of control feedback messages and commands from the video consumer end.

9. A system (100) comprising:
one or more internal data storage devices operatively coupled to one or more hardware processors for storing instructions configured for execution by the one or more hardware processors, the instructions being comprised in:
a video producer (120) configured to:
divide each frame from an acquired plurality of frames of a streaming media into a plurality of segments having a maximum size limited by a maximum transmission unit (MTU) associated with an underlying network of transmission of the plurality of media frames;
analyze the plurality of segments for characteristics that are critical for rendering the streaming media at a video consumer (130) end and thereby identify one or more critical segments from the plurality of segments, wherein the characteristics include position, segment length and video format of the streaming media;
adapt transmission semantics, in real-time, utilizing the characteristics of the identified one or more critical segments in flight by inferring to send the one or more critical segments as reliable requests with guaranteed delivery and remaining segments from the plurality of segments as unreliable requests with best-effort delivery; and
transmit the plurality of segments as REpresentational State Transfer (RESTful) requests, wherein the video producer is further configured to transmit the one or more critical segments by a confirmable (CON) message and remaining segments from the plurality of segments are transmitted by a non-confirmable (NON) message using Constrained Application Protocol (CoAP), and wherein the non-confirmable (NON) message is accompanied by a No-Response option.

10. The system of claim 9, wherein the video producer is further configured to transmit the plurality of segments as the RESTful request by utilizing CoAP with header options including:
(i) Stream_info being a request and a response option having one or more Least Significant Bits (LSBs) indicating a state of exchange (stream_state) and one or more Most Significant Bits (MSBs) indicating an identifier (stream_id) for the streaming media;
(ii) Timestamp being a request option relating to the plurality of segments to a corresponding frame in a play sequence of the streaming media; and
(iii) Position being a request option having one or more MSBs indicating an offset at which a current segment is placed in a frame corresponding to an associated timestamp and one or more LSBs indicating whether the current segment is a last segment of the frame corresponding to the associated timestamp.

11. The system of claim 10, wherein data type associated with the header options is 1 unsigned byte for the stream_info with 3 LSBs indicating the state of exchange (stream_state) and 5 MSBs indicating the identifier (stream_id); 32 bit unsigned integer for the timestamp; and 16 bit unsigned integer for the position with 15 MSBs indicating the offset and 1 LSB indicating whether the current segment is the last segment of the frame.

12. The system of claim 10, wherein the video producer is further configured to analyze the plurality of segments for characteristics that are critical for rendering the streaming media by:
determining the characteristics including position, segment length and video type of the streaming media;
comparing the determined position and segment length associated with the determined video format with corresponding characteristics in a pre-defined library of characteristics for various video formats; and
identifying one or more critical segments based on the comparison.

13. The system of claim 12 further comprising the video consumer 130 configured to:
- parse the RESTful requests and responding only for the one or more critical segments transmitted by the CON message;
- compare the timestamp (Tn) of the current segment with the time timestamp (T0) of a first segment received;
- buffer each of the plurality of segments in a circular manner from buffer0 through bufferN−1 and around based on the position associated with each of the plurality of segments, wherein the buffer is implemented as a 2-dimensional array of timestamp and position and wherein N represents number of buffers configurable based on delay performance of an associated channel of transmission; and
- play out from an appropriate buffer at a constant rate determined by a frame rate associated with the streaming media.

14. The system of claim 13, wherein the video producer is further configured to:
- abort transmitting of the remaining segments from the plurality of segments associated with a frame, in the event that transmitting of the one or more critical segments by the CON message is unsuccessful; and
- transmit the one or more critical segments of a subsequent frame.

15. The system of claim 13, wherein the video producer is further configured to perform a handshake either before transmitting the plurality of segments as a Representational state transfer (RESTful) request or during an ongoing session based on proposed parameters associated with the streaming media, negotiated parameters thereof and either accepting or rejecting of the proposed parameters or the negotiated parameters resulting in initiating transmitting of the streaming media or aborting the streaming media respectively, prior to transmitting the plurality of segments as a Representational state transfer (RESTful) request; wherein, the handshake comprises exchange of at least one of control feedback messages and commands from the video consumer end.

16. A computer program product comprising a non-transitory computer readable medium having a computer readable program embodied therein, wherein the computer readable program, when executed on a computing device, causes the computing device to:
- divide each frame from an acquired plurality of frames of a streaming media into a plurality of segments having a maximum size limited by a maximum transmission unit (MTU) associated with an underlying network of transmission of the plurality of media frames;
- analyze the plurality of segments for characteristics that are critical for rendering the streaming media at a video consumer end and thereby identify one or more critical segments from the plurality of segments, wherein the characteristics include position, segment length and video format of the streaming media;
- adapt transmission semantics, in real-time, utilizing the characteristics of the identified one or more critical segments in flight by inferring to send the one or more critical segments as reliable requests with guaranteed delivery and remaining segments from the plurality of segments as unreliable requests with best-effort delivery; and
- transmit the plurality of segments as REpresentational State Transfer (RESTful) requests wherein the video producer is further configured to transmit the one or more critical segments by a confirmable (CON) message and remaining segments from the plurality of segments are transmitted by a non-confirmable (NON) message using Constrained Application Protocol (CoAP), and wherein the non-confirmable (NON) message is accompanied by a No-Response option.

* * * * *